(12) United States Patent
Kitagawa

(10) Patent No.: US 11,922,779 B2
(45) Date of Patent: Mar. 5, 2024

(54) TOURNAMENT MANAGEMENT DEVICE

(71) Applicant: Universal Entertainment Corporation, Tokyo (JP)

(72) Inventor: Shigehiko Kitagawa, Tokyo (JP)

(73) Assignee: UNIVERSAL ENTERTAINMENT CORPORATION, Tokyo (JP)

(*) Notice: Subject to any disclaimer, the term of this patent is extended or adjusted under 35 U.S.C. 154(b) by 294 days.

(21) Appl. No.: 17/435,390

(22) PCT Filed: Feb. 21, 2020

(86) PCT No.: PCT/JP2020/007104
§ 371 (c)(1),
(2) Date: Sep. 1, 2021

(87) PCT Pub. No.: WO2020/179506
PCT Pub. Date: Sep. 10, 2020

(65) Prior Publication Data
US 2022/0148387 A1 May 12, 2022

(30) Foreign Application Priority Data

Mar. 7, 2019 (JP) ................................ 2019-041384

(51) Int. Cl.
*G07F 17/32* (2006.01)
*G06F 21/31* (2013.01)
*G06F 21/44* (2013.01)
(52) U.S. Cl.
CPC .......... *G07F 17/3276* (2013.01); *G06F 21/31* (2013.01); *G06F 21/44* (2013.01); *G07F 17/323* (2013.01); *G06F 2221/2117* (2013.01)
(58) Field of Classification Search
CPC .... G07F 17/3276; G07F 17/323; G06F 21/31; G06F 21/44; G06F 2221/2117
(Continued)

(56) References Cited

U.S. PATENT DOCUMENTS 7,690,996 B2* 4/2010 Iddings .................. G07F 17/32
463/9
8,157,647 B2* 4/2012 House .................... G07F 17/32
463/43

(Continued)

FOREIGN PATENT DOCUMENTS

JP 2006-0280527 10/2006
JP 2017-0018501 1/2017
JP 2017-0167655 9/2017

*Primary Examiner* — Allen Chan
(74) *Attorney, Agent, or Firm* — LEX IP MEISTER, PLLC

(57) ABSTRACT

A tournament management device manages tournaments consistently from making promotions to progress a game and configured to encourage a member to participate in each suitable tournament. The tournament management device includes a control unit programmed to execute the processes of: a) a process of creating tournament basic information from data including an input game content and the number of participants, and storing the tournament basic information; b) a process of creating, based on the tournament basic information, promotion information which asks for participation in a tournament, and sending the promotion information; c) a process of sending a register screen for participating in the tournament to the outside; d) a register process of storing a participant of the tournament in association with membership identification information on condition that predetermined register information is supplied; and e) a process of holding the tournament with registered participants based on the tournament basic information.

7 Claims, 21 Drawing Sheets

(58) Field of Classification Search
 USPC .......................................................... 463/25
 See application file for complete search history.

(56) References Cited

U.S. PATENT DOCUMENTS

| 8,641,515 B2 * | 2/2014 | Nicely | ................ | G07F 17/3227 |
| | | | | 463/25 |
| 2011/0045909 A1 * | 2/2011 | Cole | ................... | G07F 17/3276 |
| | | | | 463/42 |

* cited by examiner

FIG.10A

P3 — PRE-REGISTRATION CERTIFICATION

MEMBER ID: ....
NAME OF TOURNAMENT: ....
PRE-REGISTRATION NUMBER ....
NUMBER ASSIGNED TO SUB TABLE: ....

FIG.10B

P4 — REGISTRATION CERTIFICATION

MEMBER ID: ....
NAME OF TOURNAMENT: ....
REGISTRATION NUMBER: ....
SEAT NUMBER ASSIGNED TO SUB TABLE: ....

FIG.17

TOURNAMENT INFORMATION

BACCARAT TOURNAMENT A     PRELIMINARY

MONTH, DATE, TIME

SUB TABLE A1

| SEAT | MEMBER ID | REGISTRATION NUMBER |
|------|-----------|---------------------|
| A1-1 | ...       | ...                 |
| A1-2 | ...       | ...                 |
| A1-3 | ...       | ...                 |
| A1-4 | ...       | ...                 |
| A1-5 | ...       | ...                 |
| A1-6 | ...       | ...                 |

OK

BACK

TOURNAMENT INFORMATION

BACCARAT TOURNAMENT A   PRELIMINARY

MONTH, DATE, TIME

| TABLE | NUMBER OF MEMBERS WHO HAVE MADE REGISTRATION | NUMBER OF MEMBERS WHO HAVE MADE ENTRY | PROGRESS OF ENTRY |
|---|---|---|---|
| A1 | 6 | 6 | ENTRY IS COMPLETED |
| A2 | 6 | 6 | ENTRY IS COMPLETED |
| A3 | 6 | 4 | ENTRY IS BEING MADE |
| ･･･ | ･･･ | ･･･ | ･･･ |
| A7 | 6 | 3 | ENTRY IS BEING MADE |
| A8 | 6 | 6 | ENTRY IS COMPLETED |

42

BACK    OK

FIG.19

TOURNAMENT INFORMATION
62(63)

BACCARAT TOURNAMENT A    PRELIMINARY

MONTH, DATE, TIME

SUB TABLE A1

| SEAT | PLAYER | BANKER | PLAYER PAIR | TIE | SUPER SIX | BANKER PAIR |
|------|--------|--------|-------------|-----|-----------|-------------|
| A1-1 | 10,000 |        | 5,000       |     |           |             |
| A1-2 |        | 10,000 |             |     |           |             |
| A1-3 |        | 6,000  |             |     |           |             |
| A1-4 |        | 8,000  |             |     | 3,000     |             |
| A1-5 |        | 4,000  |             |     |           | 4,000       |
| A1-6 | 7,000  |        |             |     |           |             |

BACK                                                OK

FIG.20

TOURNAMENT INFORMATION

BACCARAT TOURNAMENT A   PRELIMINARY
MONTH, DATE, TIME

| TABLE | THE NUMBER OF PARTICIPANTS | BET CONDITION | NOTES |
|---|---|---|---|
| A1 | 6 | BET IS COMPLETED | |
| A2 | 6 | BET IS COMPLETED | |
| A3 | 6 | BET IS BEING MADE | |
| ..... | ..... | ..... | |
| A7 | 6 | BET IS COMPLETED | |
| A8 | 6 | BET IS BEING MADE | |

BACK    OK

TOURNAMENT MANAGEMENT DEVICE

TECHNICAL FIELD

The present invention relates to a tournament management device.

BACKGROUND

Patent Literature 1 describes a tournament management device including a means for accepting participation, a means for creating a tournament table, and a means for advancing a tournament according to the tournament table.

CITATION LIST

Patent Literatures

[PTL 1] Japanese Unexamined Patent Publication No. 2005-316807

SUMMARY OF THE INVENTION

Technical Problem

However, because a tournament management device described in Patent Literature 1 focuses on progress of a tournament, another independent process is required for execution of each process except a process of advancing the tournament, such as a promotion process which encourages participation in the tournament. As a result, the tournament cannot be consistently operated.

The present inventor thought that, if consistent operation of tournaments was possible, it would be easy to plan and to hold a large number of tournaments in a parallel way by operating tournaments automatically or semi-automatically. In special regard to the operation of tournaments, each tournament is established by participation of players who are suitable for the scale and content of the tournament. For example, the present inventor thought that although too many or too few participant players might make a tournament difficult to be held and might aggravate the dissatisfaction of players, the participation of players who are not interested in the content of the tournament also might decrease the fun of the tournament and make no sense.

In order to solve the above-described problem, an object of the present invention is to consistently operate tournaments and to provide a tournament management device capable of encouraging participation of a player whom each tournament suits.

Solution to Problem

A tournament management device of the present invention includes a transmission/reception communication port for communications with the outside and is connected to gaming tables in a communicable manner, and further includes a control unit programmed to execute:

a) a process of creating tournament basic information from data including an input game content and the number of participants, and storing the tournament basic information;

b) a process of creating, based on the tournament basic information, promotion information which asks for participation in a tournament, sampling sets of contact address information associated with the particular number of members from among sets of membership information stored in a membership database in advance, and sending the promotion information by using the sets of the contact address information;

c) a process of sending a register screen for participating in the tournament to the outside upon receiving of membership identification information associated with membership information regarding one of the members who are asked for the participation;

d) a register process of receiving a register input to the register screen and storing one of the participants of the tournament in association with the membership identification information on condition that predetermined register information is supplied; and e) a process of holding the tournament with registered participants based on the tournament basic information.

According to this arrangement, processes from the process of sending the promotion information to the process of holding the tournament are executed by the control unit. Therefore, the tournament management device of the present invention can operate tournaments consistently from making promotions to progress of the game and can encourage a member to participate in each suitable tournament. Especially, because the promotion information is created based on the tournament basic information created from the data including the game content and the number of participants, it is possible to encourage the participation of a member who is interested in the content of the tournament. Furthermore, the consistent tournament operation makes it easy to plan and hold a large number of tournaments in a parallel way by operating tournaments automatically or semi-automatically.

In the tournament management device of the present invention, registers made in the processes c) and d) are pre-registration, and the control unit is preferably programmed to further execute:

a process of executing the processes c) and d), accepting the same number of pre-registrations as the maximum number of the participants stored in advance, accepting a pre-registration as a preliminary registration in a case where the number of the participants exceeds the maximum number of the participants, notifying an acceptance target that the preliminary registration is made, and storing membership identification information of that preliminary registration and the rank of the participant who made that preliminary registration among the participants having made preliminary registrations;

based on a time limit to participate in the tournament, a process of accepting registrations of members who are going to participate at that time and authenticating information indicating that the registrations are made;

a process of specifying membership information for which the pre-registration is made and for which the registration is not made even after the preset time limit and sending cancellation information of canceling the pre-registration based on contact address information of the membership information; a process of notifying contact address information of one of the sets of the membership information of information indicating that the participation is available, a place to participate in the tournament, and the time limit, based on a waiting order of sets of membership information for which the preliminary registrations are made, and waiting for a predetermined time in accordance with the time limit in order to receive participation request information; and a process which is executed in a case where the registration of the participation is not made after elapse of the predetermined time and which repeats a process of making notification about the information indicating that the participation is available, the place to participate in the tournament, and the time limit again based on the sets of the stored membership information for which the preliminary registration is made and a process of waiting for the predetermined time in accordance with the time limit in order to receive the participation request information.

According to this arrangement, a multi-player tournament in which the maximum number of the participants in the game is limited is configured to execute the register process with two steps, i.e., a pre-registration and a registration, to accept the pre-registration while using the maximum number of the participants as an upper limit, to accept a pre-registration which is made after the number of participants exceeds the maximum number of the participants as a preliminary registration, to specify members who have only made pre-registrations, members who have made registrations after the pre-registrations, and members whose pre-registrations or registrations have been accepted as preliminary registrations, and to store these members in association with sets of contact address information. Therefore, because the participants in the game are efficiently managed in a bundle by using the promotion information of the tournament, the maximum collection of the participants in the tournament is achieved.

In the tournament management device of the present invention, the maximum number of the participants is preferably equal to capacity of the tournament.

According to the arrangement above, the pre-registrations are accepted for the same number as the maximum number of participants equivalent to the capacity of the tournament. After the number of the accepted pre-registrations reaches the maximum number of participants, pre-registrations are accepted as preliminary registrations. Therefore, even if a participation applicant who has made the pre-registration cannot participate in the tournament, the capacity of the tournament may be filled by allowing the participation of a member who has made the preliminary registration in the tournament.

In the tournament management device of the present invention, the process of performing the authentication of the information indicating that the registration is made is preferably achieved by determining whether the information indicating that the registration is made matches with pre-registration information.

According to the arrangement above, because the registration is allowed only in a case where the information indicating that the registration is made matches with the pre-registration information, the register process with two steps, i.e., the pre-registration and the registration is reliably executed.

In the tournament management device of the present invention, the gaming tables preferably include: a main table at which a main dealer who advances the tournament is placed; and a sub table at which a sub dealer who supports progress of the tournament is placed, and the main table and the sub table are in synchronization with each other when the tournament game is advanced.

According to the arrangement above, because the main table and the sub table are in synchronization with each other when the tournament game is advanced, the tournament is integrally operated.

In the tournament management device of the present invention, a table game is preferably executed at the main table, and a result of the table game is preferably predicted and gaming media are preferably betted at the sub table.

According to the arrangement above, the tournament can be efficiently advanced in such a way that the role of the main table is distinguished from the role of the sub table.

In the tournament management device of the present invention, the sub table preferably reads gaming values of the betted gaming media and sends the gaming values to a tournament server, and the tournament server preferably calculates gaming values of gaming media owned by game participants based on a result of the table game after the table game has ended, and ranks the game participants in descending order of gaming values of gaming media owned by each game participant.

According to the arrangement above, each time the table game has ended, the tournament server ranks the participants in descending order of the gaming values of the gaming media owned by each game participant. Because of this, the ranks of the participants are reliably determined even in the tournament in which the table game is executed plural times.

BRIEF DESCRIPTION OF DRAWINGS

FIG. 10A is an explanatory diagram of a pre-registration certification.

FIG. 10B is an explanatory diagram of a registration certification.

FIG. 17 is an explanatory diagram of a screen which is displayed on a sub-dealer display and which shows a member ID and registration number of each participant.

FIG. 18 is an explanatory diagram of a screen which is displayed on a main-dealer display and which shows the progress of entry of participants in each sub table.

FIG. 19 is an explanatory diagram of a screen which is displayed on the sub-dealer display and which shows a bet condition of each participant.

FIG. 20 is an explanatory diagram of a screen which is displayed on the main-dealer display and which shows bet conditions of participants in each sub table.

PREFERRED EMBODIMENT OF INVENTION

The following describes an embodiment of the present invention with reference to attached drawings.

Figure 1:
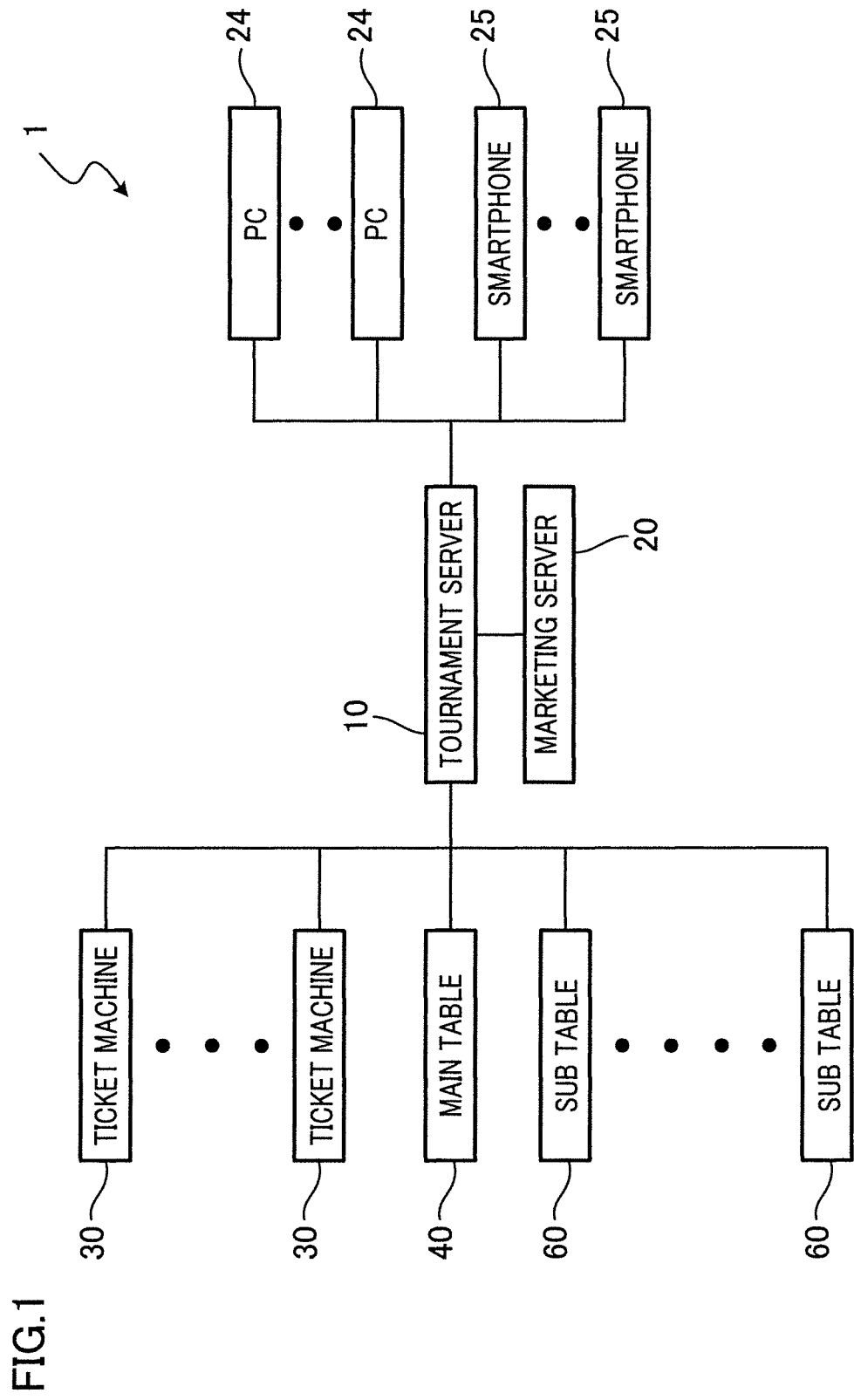
FIG. 1 schematically shows the overall structure of a tournament management device.

As shown in FIG. 1, a tournament management device 1 of the present embodiment includes a tournament server 10, a personal computer 24 (the outside) owned by a tournament staff, smartphones 25 owned by applicants for participation, i.e., participation applicants, ticket machines 30 provided in the site of a tournament, a main table 40, and sub tables 60. This tournament management device 1 creates basic information of a table game executed in a tournament scheme (hereinafter, this game is referred to as a tournament game; the game may be also referred to as a tournament), makes promotions, pre-registrations, and registrations, and manages the progress of a tournament game. The participation in a tournament is achieved in such a way that a participation applicant makes a pre-registration and a registration. In the present embodiment, baccarat is executed as the table game. However, the type of the table game is not particularly limited and, e.g., poker may be executed.

Figure 2:
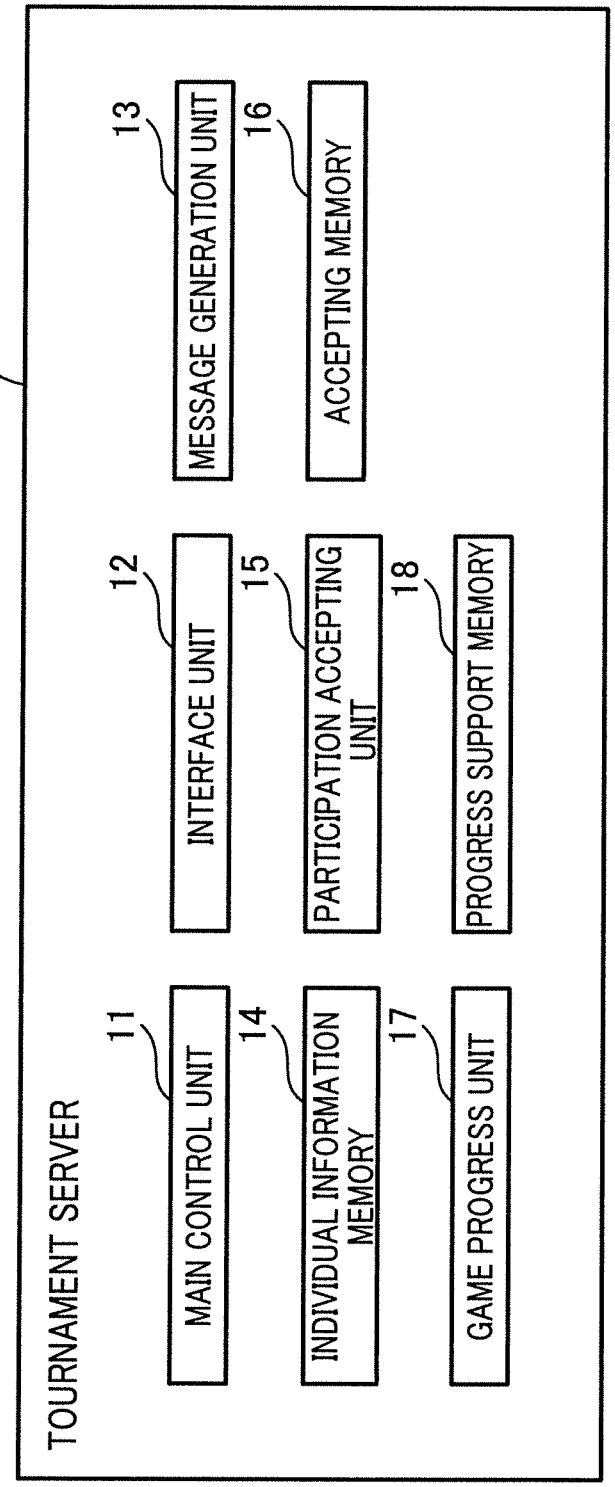
FIG. 2 is a block diagram of the structure of a tournament server.

The tournament server 10 is connected to a marketing server 20 and controls the creation of basic information of a tournament in which the table game is executed plural times, promotions, pre-registrations, registrations, and the management of the progress of the tournament. As shown in FIG. 2, the tournament server 10 includes a main control unit 11, an interface unit (transmission/reception communication port) 12, a message generation unit 13, an individual information memory 14, a participation accepting unit 15, an accepting memory 16, a game progress unit 17, and a progress support memory 18. These components are connected to one another, and are collectively controlled by the main control unit 11.

The main control unit 11 controls the entire tournament server 10, and especially reads and executes each set of application software stored in the participation accepting unit 15 and the game progress unit 17. A user logs in (i.e., executes an authentication process) the tournament server 10 by using his/her ID and password, and then uses the tournament server 10.

The interface unit 12 is an interface used when transmission/reception of data is performed between the tournament server 10, the marketing server 20, a PC 24, the smartphones 25, the ticket machines 30, the main table 40, and the sub tables 60. The tournament server 10 is connected to the marketing server 20, a PC 24, the smartphones 25, the ticket machines 30, the main table 40, and the sub tables 60 over a network.

The message generation unit 13 reads data from the individual information memory 14, the participation accepting unit 15, and the accepting memory 16 according to need, adds the data to data supplied from a PC 24 and a ticket machine 30, and generates a promotion screen, a pre-registration screen (i.e., a register screen), and a registration screen. Each generated screen is sent to the ticket machine 30 by the main control unit 11 via the interface unit 12. The generated promotion screen is also sent to a smartphone 25.

The individual information memory 14 stores a database which stores information regarding staffs of tournaments and a database (i.e., membership database) which stores information regarding members who wish to participate in tournaments. In this regard, the individual information memory 14 stores the following sets of information in addition to an ID and a password which identify each staff: a member ID which is membership information; and a combination of the member ID and a password which are membership identification information associated with the membership information. The individual information memory 14 further stores an email address of each of smartphones 25 owned by members, as contact address information associated with the membership information.

The participation accepting unit 15 provides application software which is available at a PC 24 and a ticket machine 30 for creating basic information of a tournament and making promotions, pre-registrations, registrations, etc. The accepting memory 16 stores sets of data which are input at the time of creation of basic information of a tournament and at the time of making pre-registrations and registrations of a tournament. These sets of data are sets of information which are required for creating basic information of a tournament, etc., such as a name of the tournament, an amount of prize money to be won, a type of the tournament which is associated with the name of the tournament, a day, time, and place to participate in the tournament, and the number of participants.

The game progress unit 17 provides application software which is available for a main dealer and a sub dealer who manage the progress of a tournament. The progress support memory 18 stores gaming values of chips which are gaming media owned by participants. The gaming values vary in accordance with the progress of a tournament.

A PC 24 is operated by a tournament staff to create basic information of a tournament, and connected to the tournament server 10 in a communicable manner. The PC 24 may be a smartphone or a tablet PC.

The smartphones 25 are respectively owned by members who register their contact addresses such as email addresses with the individual information memory 14 in advance, and connected to the tournament server 10 in a communicable manner. Each smartphone 25 may be a PC or a tablet PC.

Figure 3:
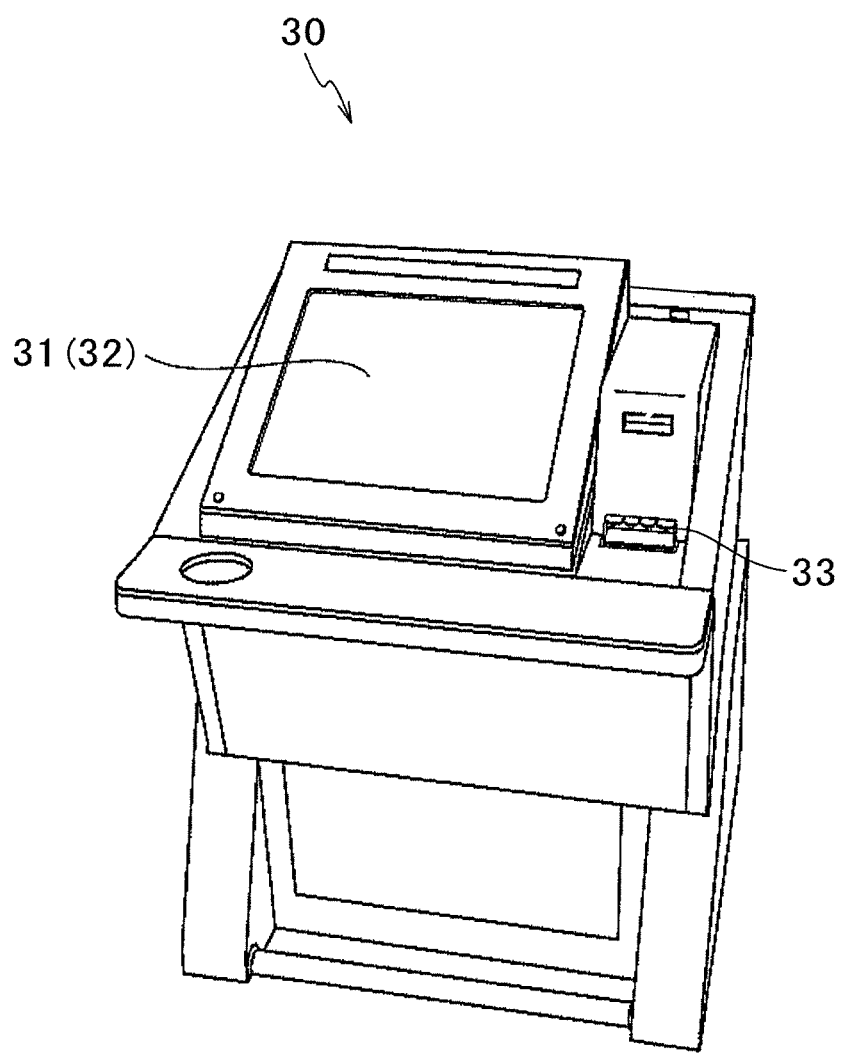
FIG. 3 is a perspective view of a ticket machine.
Figure 4:
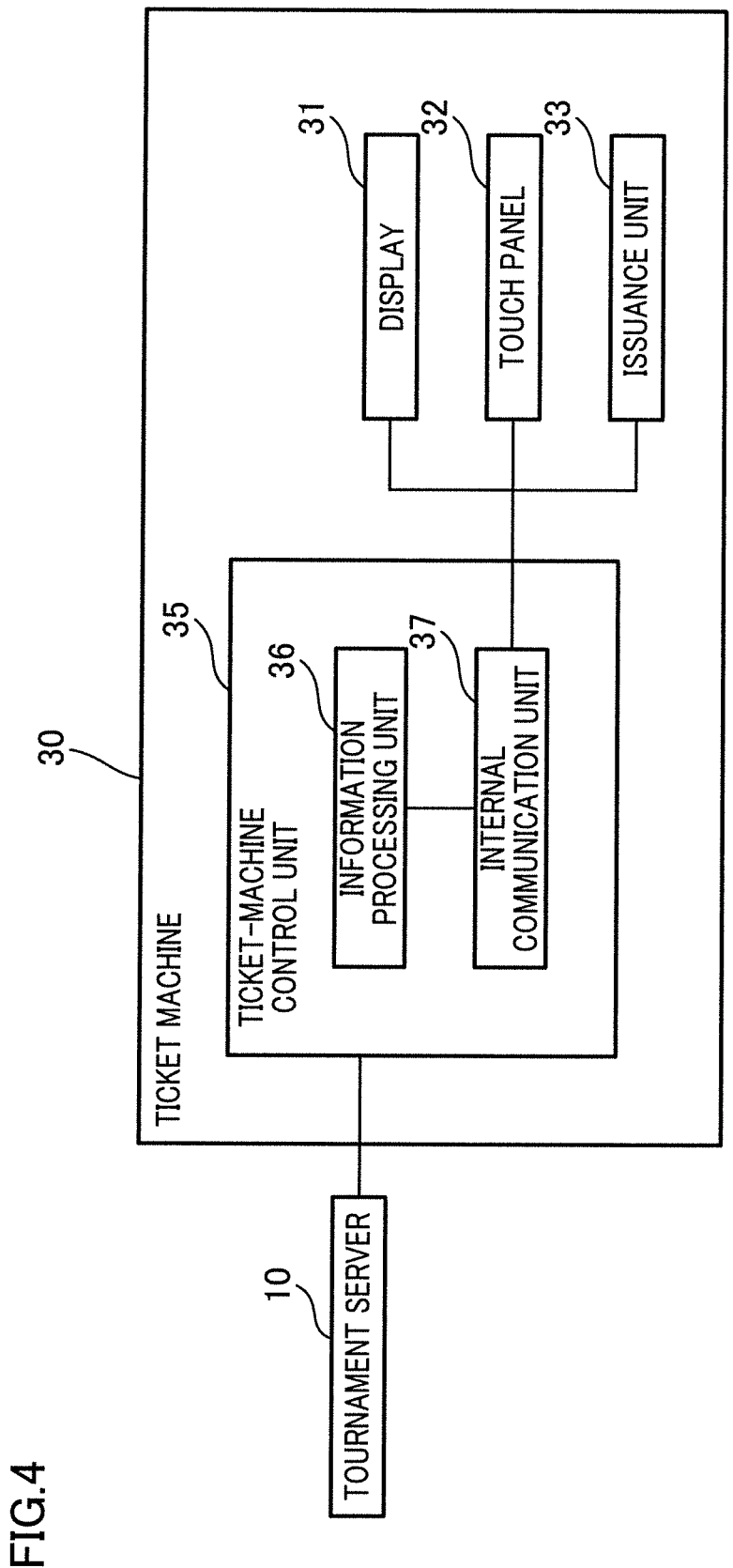
FIG. 4 is a block diagram of the internal structure of the ticket machine.

A ticket machine 30 makes the promotions, pre-registrations, and registrations of a tournament by using the application software supplied from the tournament server 10. As shown in FIG. 3, the ticket machine 30 includes a display 31 which displays a screen, a touch panel 32 which is an input device, an issuance unit 33 configured to issue each certification described later, and a ticket-machine control unit 35 (see FIG. 4) configured to control the operation of the ticket machine 30.

The ticket-machine control unit 35 is connected to be able to perform transmission/reception of information with the tournament server 10. The ticket-machine control unit 35 includes an information processing unit 36 configured to control the entire operation of the ticket machine 30 and an internal communication unit 37 configured to perform transmission/reception of information between the display 31, the touch panel 32, and the issuance unit 33.

Figure 6:
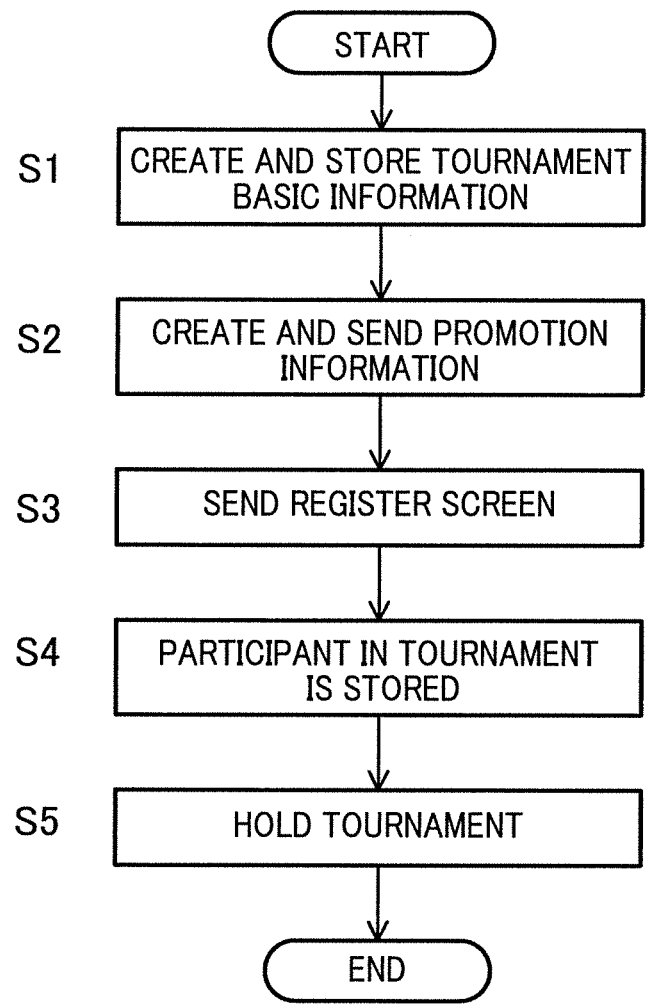
FIG. 6 is a flowchart showing operation steps of the tournament server which manages a tournament.

The following describes operation steps of the main control unit 11 with reference to FIG. 6. The main control unit 11 is programmed to execute:

a) a process of creating tournament basic information from data including an input game content and the number of participants, and storing the tournament basic information (step S1);

b) a process of creating, based on the tournament basic information, promotion information which asks for participation in a tournament, sampling sets of contact address information associated with the particular number of members from among sets of membership information stored in the membership database in advance, and sending the promotion information by using the sets of the contact address information (step S2);

c) a process of sending a register screen for participating in the tournament to the outside upon receiving membership identification information associated with membership information regarding one of the members who are asked for the participation (step S3);

d) a register process of receiving a register input to the register screen and storing one of the participants of the tournament in association with the membership identification information on condition that predetermined register information is supplied (step S4); and e) a process of holding the tournament with registered participants based on the tournament basic information (step S5). In this regard, registers made in the processes c) and d) indicate pre-registrations. In the present embodiment, registration is made through two steps, i.e., a pre-registration and a registration.

The following describes operation steps regarding the creation of basic information of a tournament, the promotion of the tournament to be held, a pre-registration for participating in the tournament, and a registration after the pre-registration is made.

Figure 7:
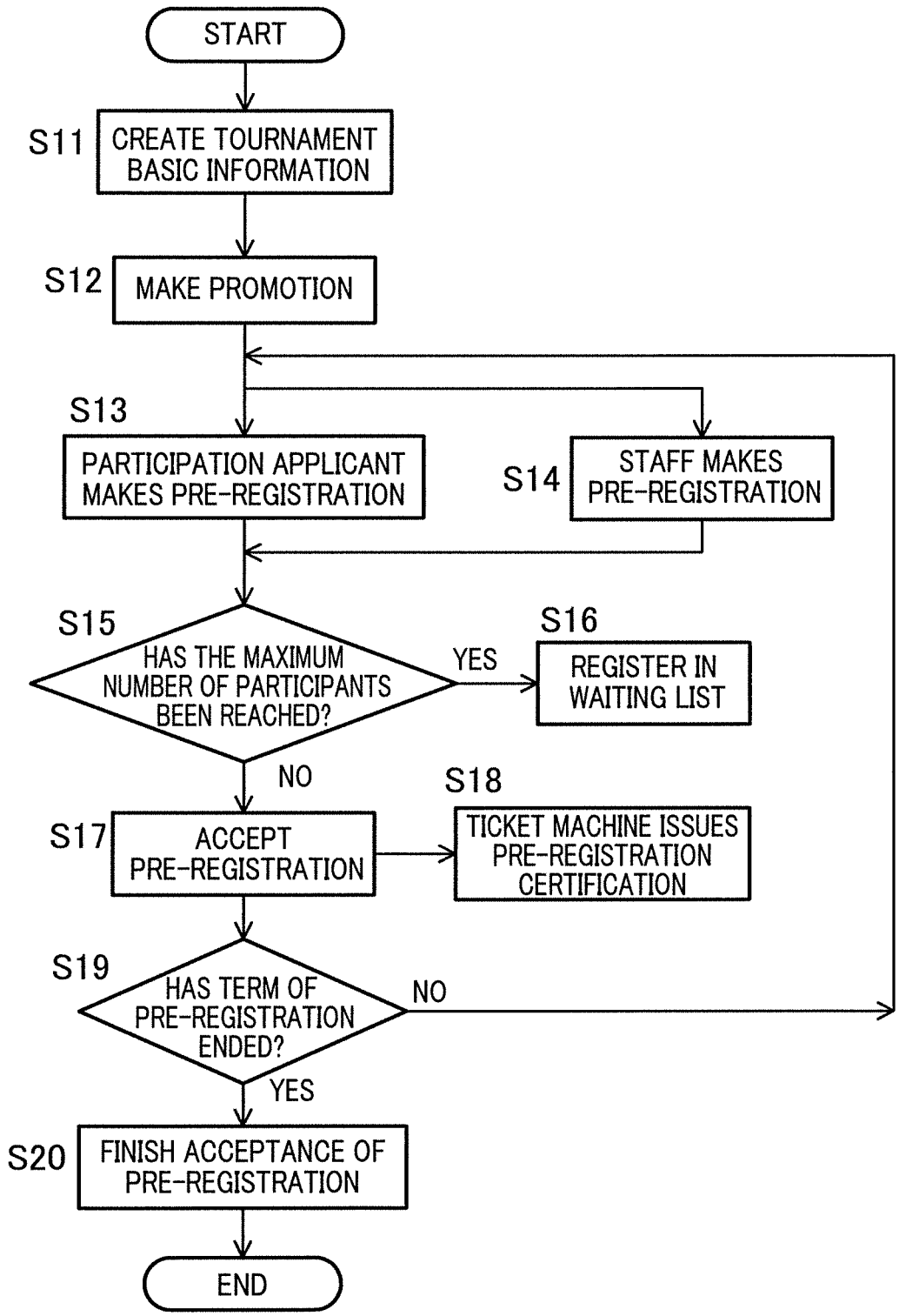
FIG. 7 is a flowchart showing operation steps of the tournament server in a case where a pre-registration is made for a tournament.

As shown in FIG. 7, in the step S11, a staff who holds a tournament creates basic information of the tournament by a PC 24. The staff refers to a login screen to the tournament server 10 on a display of the PC 24, and enters his/her ID and password with a keyboard. This input data is sent to the tournament server 10. The main control unit 11 of the tournament server 10 performs authentication of the staff by determining whether the ID and password of the staff which are supplied via the interface unit 12 match with data stored in the individual information memory 14.

Once the authentication of the staff is successfully done, the login to the tournament server 10 is completed. The staff selects a basic-information creation menu option for creating the basic information of the tournament from a menu provided by the participation accepting unit 15. Because of this, the main control unit 11 of the tournament server 10 reads application software for creating the basic information from the participation accepting unit 15, and sends the application software to the PC 24 via the interface unit 12.

Figure 5:
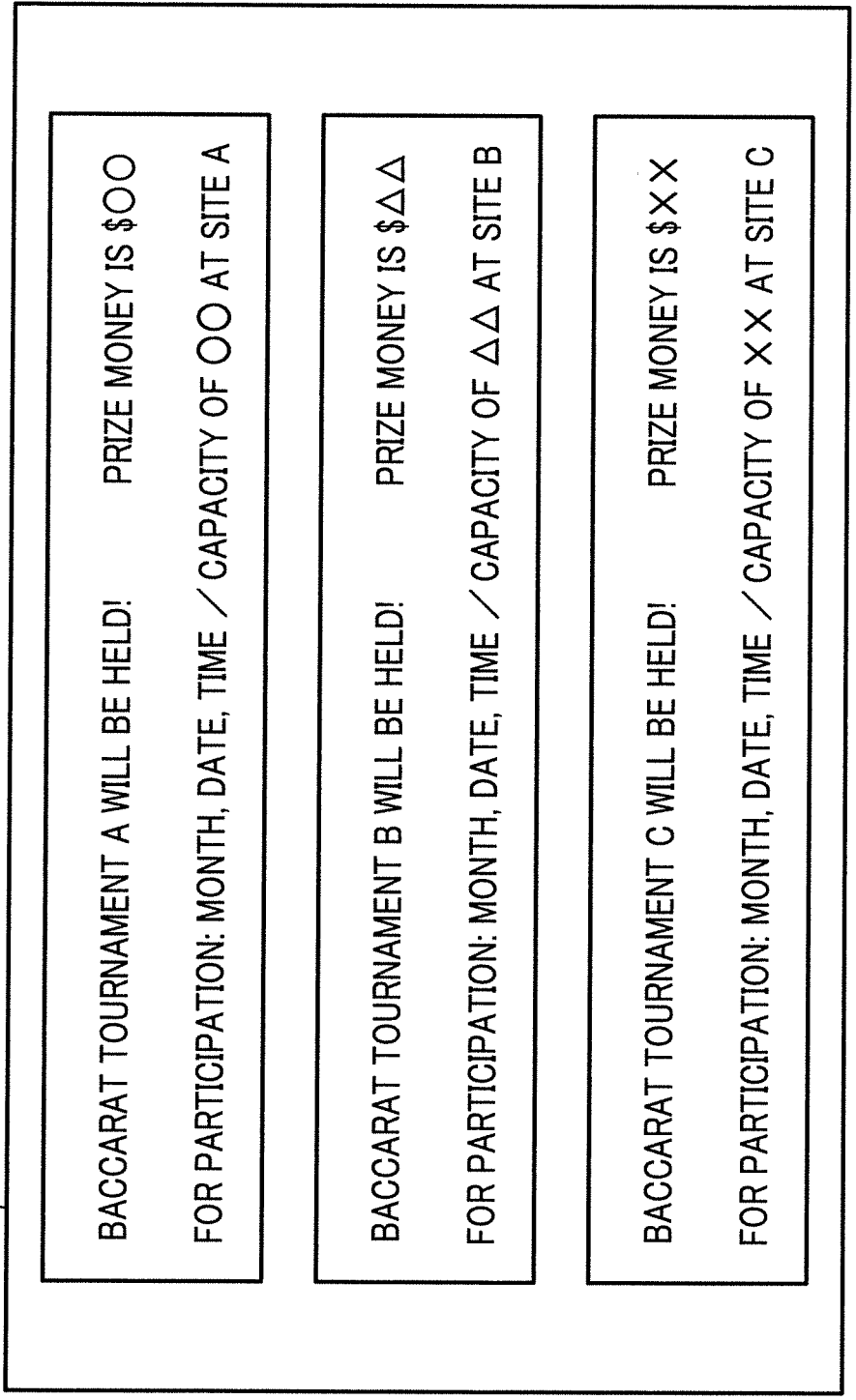
FIG. 5 is an explanatory diagram of a promotion screen of tournaments to be held.

The PC 24 to which this data is supplied displays a screen for creating the basic information on the display. The staff referring to this screen inputs sets of data required for creating the basic information. The sets of data required for creating the basic information include a game content and the number of participants. To be more specific, the sets of data are a name of the tournament, an amount of prize money to be won, a type of the tournament which is associated with the name of the tournament, a day, time, and place to participate in the tournament, and the number of participants. These sets of input data are sent to the tournament server 10 and the marketing server 20, and stored in the accepting memory 16. In the step S12, the main control unit 11 causes the marketing server 20 to create a promotion screen P1 (see FIG. 5) which is promotion information asking for the participation in the tournament, based on the basic information.

The main control unit 11 makes the promotion of the tournament by using the created promotion screen P1. To be more specific, the main control unit 11 samples a particular number of sets of membership information from among sets of membership information stored in advance in the membership database. The particular number of the sets of the membership information is determined according to the basic information of the tournament. Because baccarat is played in the present embodiment, sets of membership information of members who are interested in baccarat are sampled. The more people participate in the tournament, the more sets of membership information are sampled. However, the disclosure is not limited to this. For example, the particular number of the sets of the membership information may be sampled based on the following sets of information: a participation history in tournaments; how many times each member has played baccarat; how long each member has played baccarat; a ratio of time to play baccarat to time to play all types of the game including the slot game; and a ratio of time to play baccarat to time to play all types of the card game except baccarat.

Based on these sets of the membership information, the main control unit 11 sends the promotion screen P1 to each smartphone 25 from the interface unit 12 by using email addresses stored in the individual information memory 14. The promotion screen P1 is sent also to each ticket machine 30 from the interface unit 12, and displayed onto the display 31.

The promotion screen P1 on the smartphones 25 or the promotion screen P1 on the displays 31 of the ticket machines 30 informs members that a tournament will be held, and among the members, a participation applicant who is able to participate in the tournament makes a pre-registration. At this time, the participation applicant selects either a pre-registration at a ticket machine 30 in the site of the tournament by himself/herself (step S13) or a pre-registration by requesting the staff to access the tournament server 10 from the PC 24 (step S14).

When the step S13 is selected and a login to the tournament server 10 is completed, the participation applicant selects a pre-registration menu option from the menu provided by the participation accepting unit 15. Because the main control unit 11 of the tournament server 10 receives, at the time of each login, membership identification information (i.e., member ID and password) associated with membership information of a member who is asked for the participation in the tournament, the main control unit 11 executes a pre-registration process in which a pre-registration screen for participating in the tournament is sent to the outside (ticket machine 30) in accordance with this reception.

Figure 9:
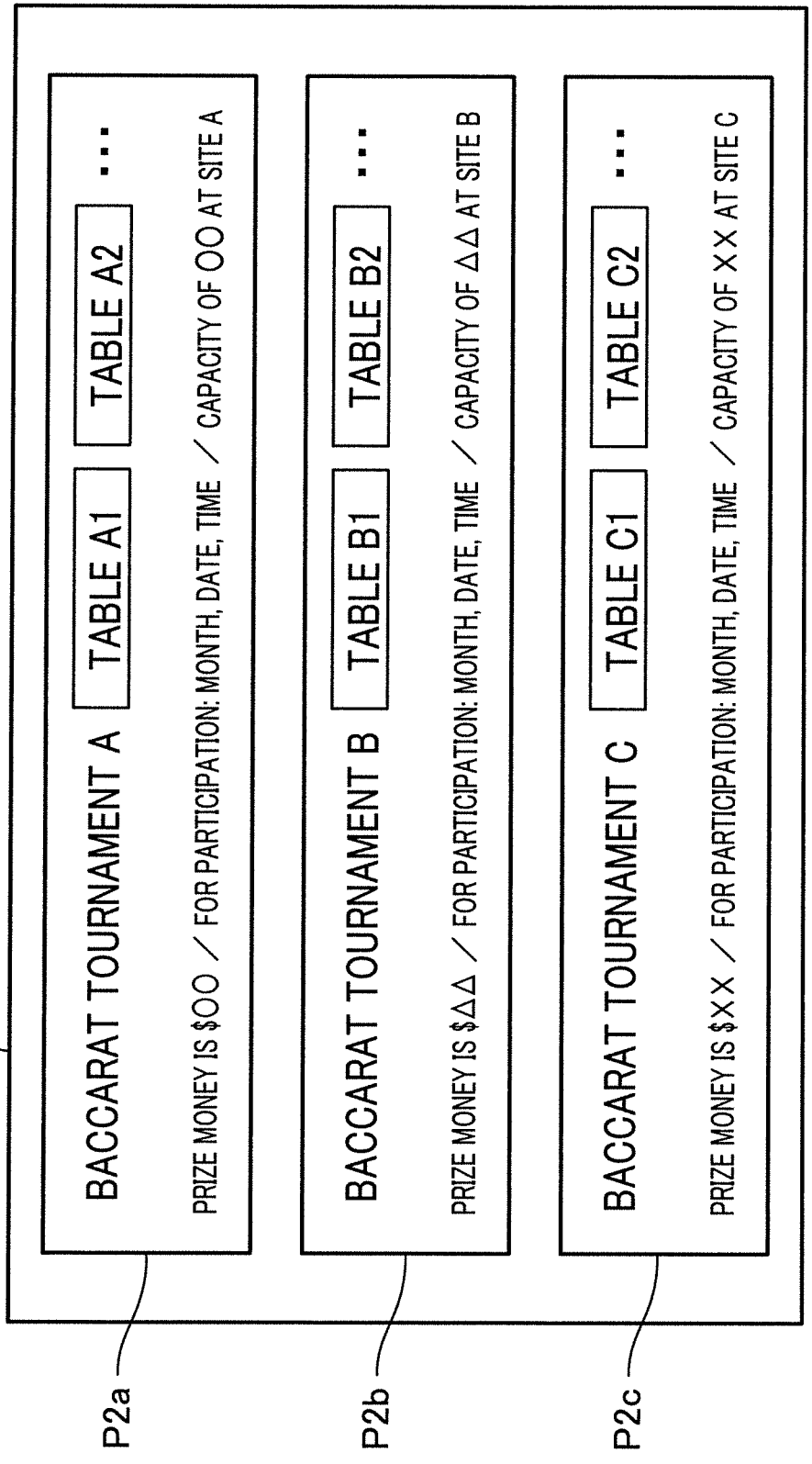
FIG. 9 is an explanatory diagram of a pre-registration screen displayed on a display.

Execution of the pre-registration process requires the main control unit 11 to read application software for making the pre-registration from the participation accepting unit 15, and to send the application software to the ticket machine 30 via the interface unit 12. In the ticket machine 30 to which this data is supplied, the information processing unit 36 causes the display 31 to show a pre-registration screen P2 (see FIG. 9) via the internal communication unit 37 and the pre-registration is made. Each of pre-registration screens P2a to P2c shows a name of a tournament to be held later, an amount of prize money to be won, a type of the tournament which is associated with the name of the tournament, a day, time, and place to participate in the tournament, the number of participants, and numbers assigned to sub tables (e.g., A1, A2, B1, B2, and so on). The time to participate in the tournament indicates the time when the participation applicant will arrive at the place to participate in the tournament (i.e., place where the tournament is held). The participation applicant selects a name of a tournament in which he/she wishes to participate and a number assigned to a sub table at which he/she wishes to take a seat, and enters these sets of information on the touch panel 32.

The sets of information which are input in the pre-registration are sent to the tournament server 10 from the ticket-machine control unit 35, as pre-registration information. This pre-registration information includes the member ID, the name of the tournament for which the pre-registration has been made, a pre-registration number, and the number assigned to the sub table to be sit.

In the step S15, the main control unit 11 to which the pre-registration information is supplied determines whether the number of participants of the selected tournament has reached the maximum number of participants which is stored in the accepting memory 16 in advance. When the number of participants of the selected tournament does not reach the maximum number of participants, the process shifts to the step S17 and the main control unit 11 accepts the pre-registration. The "maximum number of participants" indicates the number of people who are allowed to make the pre-registration, and the number of people who are allowed to make the pre-registration is equal to the capacity of the tournament.

After the main control unit 11 receives (i) a pre-registration input on the pre-registration screen and (ii) predetermined pre-registration information in the step S17, the following sets of information are sent to the ticket machine 30: the time to participate in the tournament; and the place, which is different between pre-registrations, to participate in the tournament.

In order to send each set of information to the ticket machine 30, the main control unit 11 causes the message generation unit 13 to generate a completion screen of the pre-registration based on the pre-registration information. This completion screen shows the pre-registration information, i.e., the member ID, the name of the tournament for which the pre-registration has been made, the pre-registration number, and the number assigned to the sub table to be sit. The generated screen is sent to the ticket machine 30 from the interface unit 12 and displayed on the display 31, and the information processing unit 36 causes the issuance unit 33 to issue a pre-registration certification P3 (step S18). As shown in FIG. 10A, the pre-registration information is printed on the pre-registration certification P3 in the same manner as on the completion screen of the pre-registration on the display 31. In addition to that, the main control unit 11 associates the pre-registration information including the type of the tournament and the place to participate in the tournament with the member ID and the password, and stores the pre-registration information in the accepting memory 16.

When the main control unit 11 determines that the number of people who make pre-registrations has reached the maximum number of participants in the step S15, the participation applicant who makes a pre-registration after the number of the people exceeds the maximum number of participants is registered in a waiting list (step S16) and this pre-registration of the participation applicant for the tournament is accepted as a preliminary registration. After the main control unit 11 accepts the preliminary registration, an acceptance target (ticket machine 30) is notified that the preliminary registration has been made. At the same time, the following sets of information are stored in the accepting memory 16: the member ID and the password for which the preliminary registration has been made; and the rank of that member among the members having made preliminary registrations.

As described later, the participation applicant who has made the pre-registration for the tournament goes to the site of the tournament and makes a registration before the end of the time limit to participate in the tournament, with the result that the participation in the tournament is confirmed. In this regard, when the participation applicant who has made the pre-registration for the tournament does not make the registration, the pre-registration is cancelled and the participation in the tournament is not allowed. In this regard, the waiting list is a list of, for example, IDs of members who will be allowed to participate in the tournament when cancellation occurs.

During the acceptance of pre-registrations, the main control unit 11 determines whether a term of pre-registrations has ended in the step S19. For example, this term of the pre-registrations is set to start three hours before the start of the tournament. However, the disclosure is not limited to this. When it is determined that the term of the pre-registrations has ended, the process shifts to the step S20 and the main control unit 11 stops the acceptance of the pre-registrations. When the term of the pre-registrations does not end, the process returns to the step S13 or the step S14 and the acceptance of the pre-registrations continues.

The case where the participation applicant makes the pre-registration by himself/herself at the ticket machine 30 in the site of the tournament (step S13) is described above. Because the same operation steps are executed between the main control unit 11 and the PC 24 also in a case where the participation applicant requests the staff to access the tournament server 10 from the PC 24 in order to make a pre-registration (step S14), descriptions of these steps are omitted.

Participation applicants who have made pre-registrations go to a registration area in the site of the tournament, and make registrations before the end of the time limit to participate in the tournament. In the registration area, the ticket machines 30 are provided. A staff is placed at each ticket machine 30, and the staff logs in the tournament server 10 via the ticket machine 30. The tournament server 10 accepts the registrations of members who are going to participate in the tournament by the time limit to participate in the tournament. The "time limit to participate in the tournament" indicates a term of registrations after the pre-registrations for the tournament, and is later than the time to participate in the tournament. In the present embodiment, a time to start the tournament is set to be 2 PM, a time to participate in the tournament is set to be 1 PM, and the time limit to participate in the game is set to be 1:30 PM. However, these specific times can be determined arbitrarily.

After the login to the tournament server 10, the staff selects a registration menu option for the tournament from the menu provided by the participation accepting unit 15. Because of this, the main control unit 11 of the tournament server 10 reads application software for making a registration from the participation accepting unit 15, and sends the application software to the ticket machine 30 via the interface unit 12.

Figure 8:
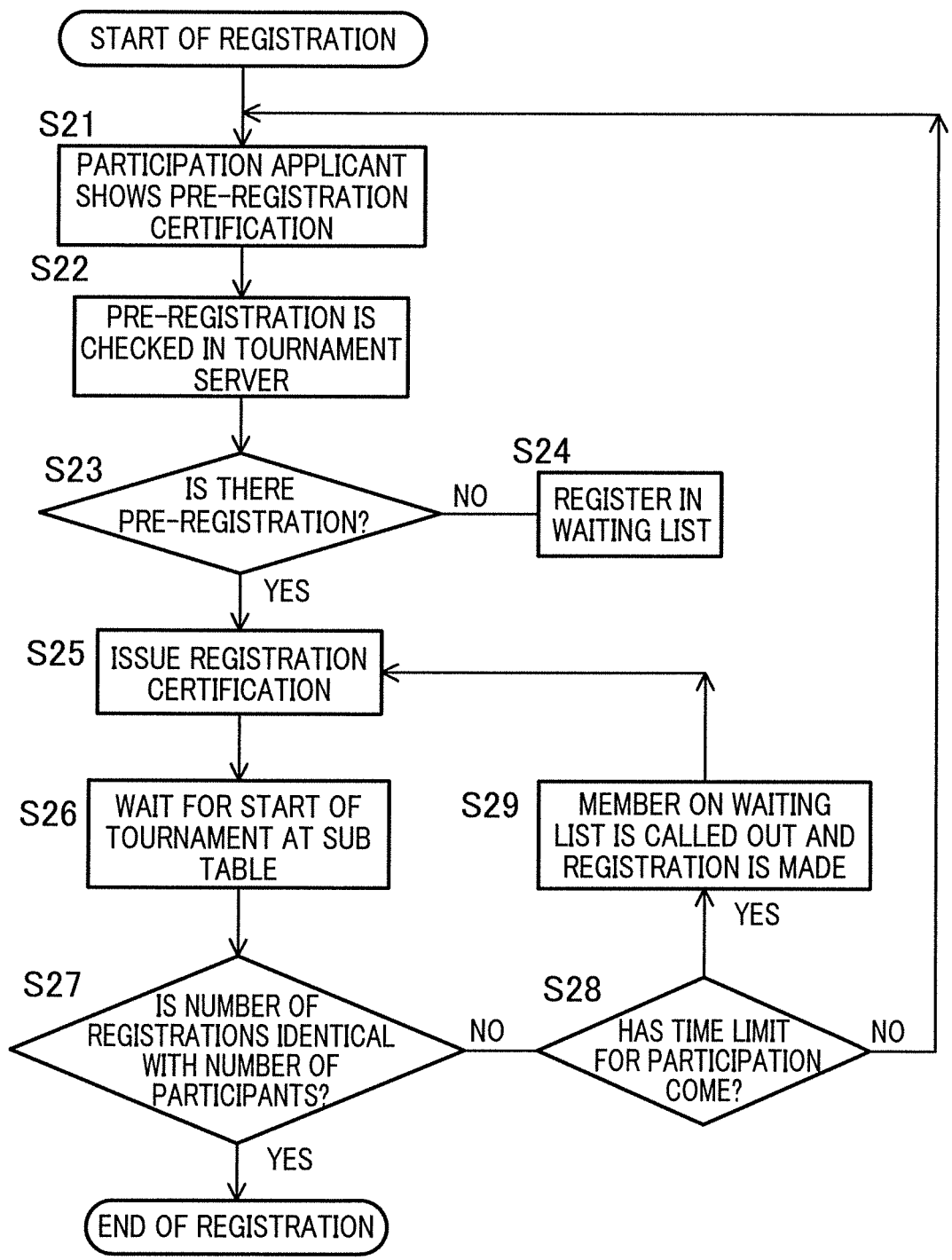
FIG. 8 is a flowchart showing operation steps of the tournament server in a case where a registration is made for a tournament.

In the ticket machine 30 to which this data is supplied, the information processing unit 36 causes the display 31 to show a registration screen via the internal communication unit 37 and the registration is made. In the step S21 of FIG. 8, each participation applicant shows the pre-registration certification P3 to the staff, and the staff enters the following sets of data which are described on the pre-registration certification P3: a member ID; a name of the tournament; a pre-registration number; and a number assigned to a sub table to be sit.

The sets of data which are input in the registration are sent to the tournament server 10 via the ticket-machine control unit 35, as information indicating that the registration is made. When this information is supplied, the tournament server 10 determines whether it is the registration by the participation applicant who has made a pre-registration (step S22). Only when it is the registration by the participation applicant who has made the pre-registration, the registration is allowed. When the determination is performed, the main control unit 11 of the tournament server 10 determines whether the pre-registration has been made by determining whether the following sets of data which are supplied via the interface unit 12 match with pre-registration information stored in the accepting memory 16: the member ID; the name of the tournament; the pre-registration number; and the number assigned to the sub table to be sit (step S23).

When the information indicating that the registration is made matches with the pre-registration information, the main control unit 11 determines that the pre-registration has already been made, allows the registration, and replaces the pre-registration information in the accepting memory 16 with registration data. This registration data includes a registration number and a seat number to be sit which are provided in addition to the member ID and the name of the tournament which are the same as in the pre-registration information.

Once the registration is allowed, the main control unit 11 causes the message generation unit 13 to generate a completion screen of the registration. This completion screen shows the registration data, i.e., the member ID, the name of the tournament for which the registration has been made, the registration number, and the seat number assigned to the sub table to be sit. The generated screen is sent to the ticket machine 30 from the interface unit 12 and displayed on the display 31, and the information processing unit 36 causes the issuance unit 33 to issue a registration certification P4 (step S25). As shown in FIG. 10B, the registration data is printed on the registration certification P4 in the same manner as in the completion screen of the registration on the display 31.

When the information indicating that the registration is made does not match with the pre-registration information, the main control unit 11 determines that the pre-registration is not made and the registration is not allowed in the step S23. The process then shifts to the step S24, and the participation applicant who makes this registration is registered in a waiting list and this registration of the participation applicant for the tournament is accepted as a preliminary registration. Because the register for the waiting list is the same as that described above, descriptions are omitted.

Each participant for which the registration certification P4 is issued sits down at the seat of the sub table described in the registration certification P4, and waits for the start of the tournament (step S26). Subsequently, the main control unit 11 determines whether the number of registrations is identical with the number of participants in the tournament in the step S27. When the number of registrations is correct, the acceptance of registrations is stopped.

When the number of the registrations is not identical with the number of all people who have made the pre-registrations, the process shifts to the step S28 and the main control unit 11 determines whether the time limit, which is set in advance, to participate in the tournament (i.e., the time limit to make the registration after the pre-registration) has come. When the time limit to participate in the tournament does not come, the process returns to the step S21 and the acceptance of pre-registrations continues.

When the time limit to participate in the tournament has come, the main control unit 11 cancels the pre-registration. In the cancellation of the pre-registration, the main control unit 11 specifies a member ID of a member who has made the pre-registration and who does not make the registration after the end of the preset time limit to participate in the tournament, and sends cancellation information of the pre-registration to a smartphone 25 based on an email address associated with the member ID.

In regard to this, because the participation applicant for which the pre-registration is cancelled is not allowed to make the registration and cannot participate in the game, cancellation occurs in the tournament. Therefore, the main control unit 11 reads information of the waiting list which is stored in the accepting memory 16 and allows one participation applicant registered in the waiting list to make a registration (step S29). Based on a waiting order of member IDs of members whose pre-registrations or registrations have been accepted as preliminary registrations on the waiting list, the main control unit 11 makes notification about information indicating that participation is available, the place to participate in an available tournament, and the time limit to participate in the available tournament to an email address of a member ID of a member for which the preliminary registration has been made for the first time. After that, the main control unit 11 waits for a predetermined time in accordance with the time limit to participate in the available tournament, in order to receive participation request information of the corresponding member for the tournament. While in the present embodiment a predetermined waiting time is ten minutes from the time limit to participate in the tournament (i.e., 1:30 PM), the disclosure is not limited to this.

During the receiving of the participation request information, the member is allowed to make a registration on the tournament. The member who wishes to participate in the tournament goes to the ticket machine 30, and the staff enters the member ID, a name of the tournament, and a number assigned to a sub table to be sit on a registration screen of the ticket machine 30. Once the registration is allowed, the main control unit 11 causes the message generation unit 13 to generate a completion screen of the registration. This completion screen shows the registration data, i.e., the member ID, the name of the tournament for which the registration has been made, the registration number, and the seat number assigned to the sub table to be sit. The generated screen is sent to the ticket machine 30 from the interface unit 12 and displayed on the display 31, and the information processing unit 36 causes the issuance unit 33 to issue the registration certification P4.

When the registration of participation is not made after the elapse of ten minutes, i.e., when a predetermined waiting time elapses, the main control unit 11 makes notification about information indicating that participation is possible, the place to participate in an available tournament, and the time limit to participate in the available tournament to an email address of a member ID who has made a preliminary registration and which is secondly stored in the waiting list. Until the number of registrations becomes equal to the number of participants in the tournament, these serial operation steps are repeatedly executed. The member who has made the registration through these operation steps is allowed to participate in the tournament. The member who has made the registration sits down at the seat of the sub table described in the registration certification P4, and waits for the start of the tournament.

The following describes the management of progress of the tournament with use of the tournament management device 1. In the site of the tournament, one main table 40 (see FIG. 11) and eight sub tables 60 (see FIG. 13) are provided. The number of sub tables 60 may be arranged in accordance with the capacity of the tournament.

The tournament held with use of the tournament management device 1 of the present invention is a game of baccarat in a tournament scheme in which a preliminary, quarterfinal, semifinal, and final are held in this order and in which 48 participants participate. At the main table 40, the game of baccarat is played in such a way that a dealer turns over cards distributed to a player and a banker, and the participants sitting down at the sub tables 60 predict a result of the game of baccarat and place bets on the sub tables 60.

Out of the 48 participants participating in the preliminary, 36 high-score participants advance to the quarterfinal, 18 participants out of the 36 high-score participants advance to the semifinal, and 6 participants finally advance to the final. Out of the participants who reach the final, the first-place winner, the second-place winner, and the third-place winner are determined in order of scores.

The game of baccarat is executed for five rounds in the preliminary, two rounds in the quarterfinal, and one round in each of the semifinal and the final. The game of baccarat is executed fifteen times in a round. In this regard, the following points are not particularly limited: the number of participants participating in the preliminary, in the quarterfinal, in the semifinal, and in the final; and how many times the game of baccarat is executed in a round.

Figure 11:
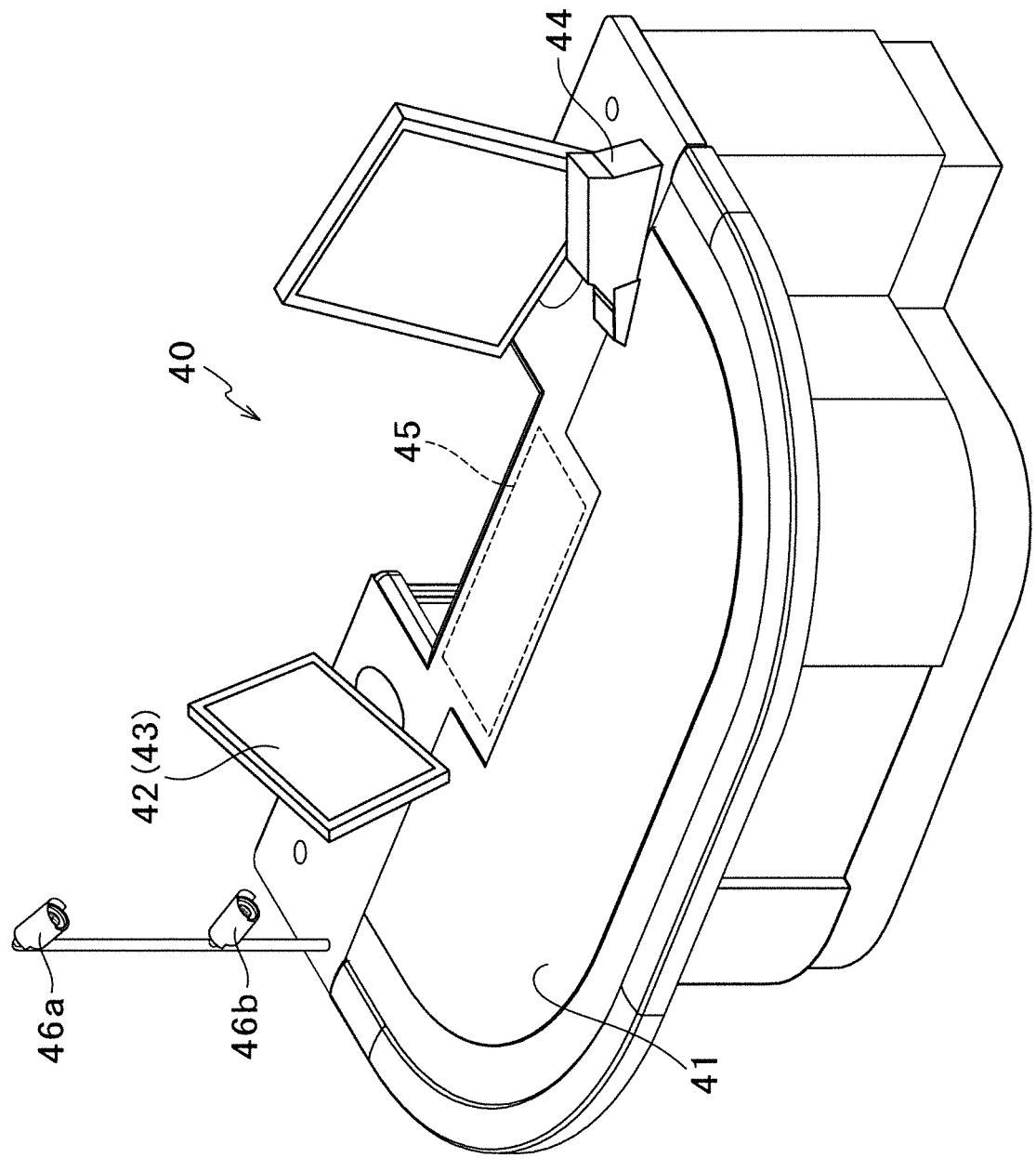
FIG. 11 is a perspective view of a main table.

At the main table 40 shown in FIG. 11, a main dealer who advances the tournament is placed so that a game of baccarat can be executed. The main dealer is placed on the notch side opposite to the substantially-arc side of a top board 41, and advances the game of baccarat. The main table 40 has the same shape and function as each sub table 60, but the following description presupposes that the table is used as the main table 40.

Figure 12:
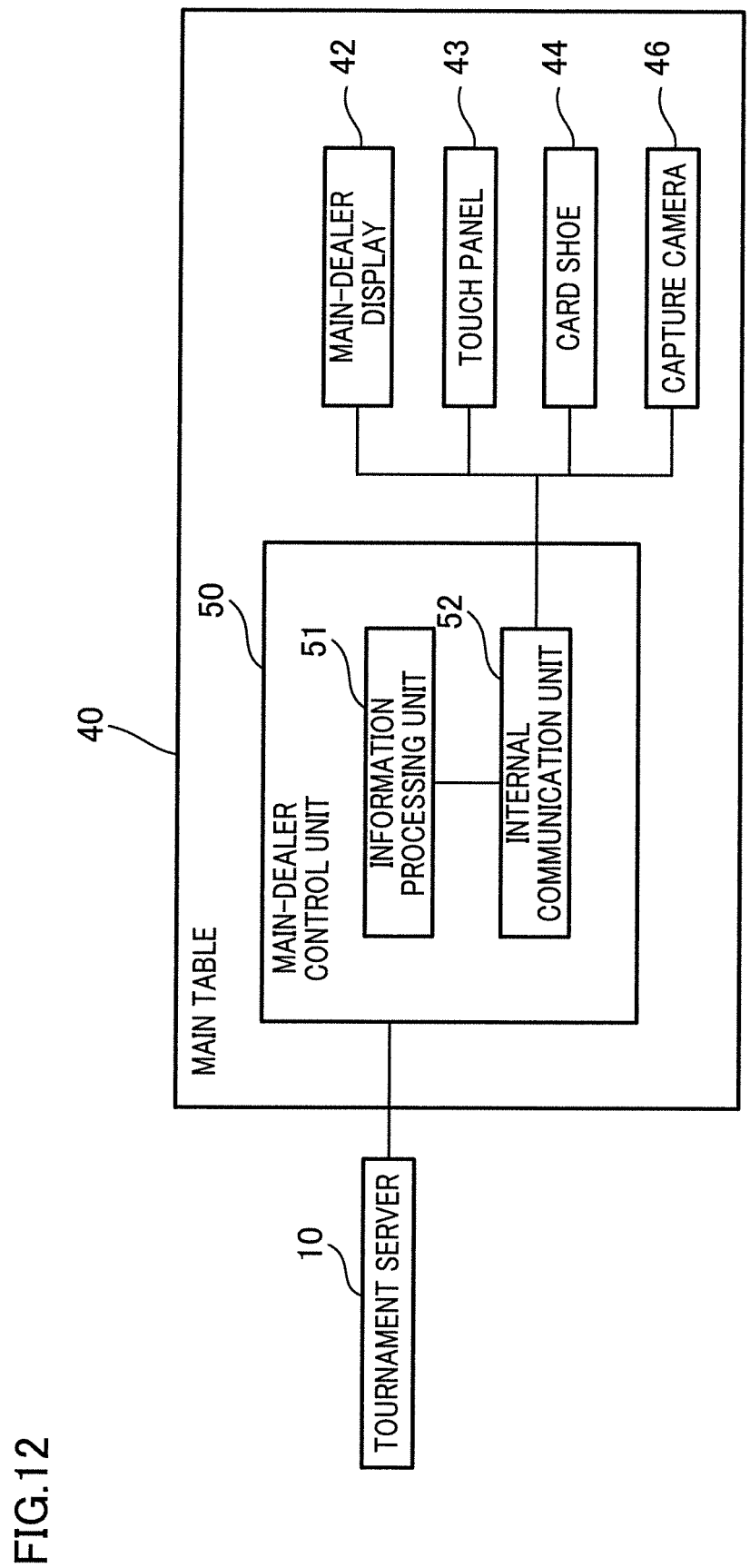
FIG. 12 is a block diagram of the structure of a main-dealer control unit.

The main table 40 includes a main-dealer display 42, a card shoe 44, a card arrangement area 45, capture cameras 46 (46*a* and 46*b*), and a main-dealer control unit 50 (see FIG. 12).

The main-dealer display 42 is provided on the top board 41, and includes a touch panel 43 configured to receive an input from the main dealer. The card shoe 44 is arranged so that cards can be serially taken out therefrom, and the main dealer advances the game by taking out a card from the card shoe 44. The main dealer takes out cards from the card shoe 44, and places the cards in the card arrangement area 45 to be separated into the player side and the banker side.

The card shoe 44 includes a scanner. When the main dealer takes out cards from the card shoe 44, an image on each card is read by the scanner. The card shoe 44 executes a process such as image recognition regarding an image read from the card by the scanner, so as to specify the details of the card such as the number, the mark indicating the type of the card, and the picture. The main-dealer control unit 50 sends the details of the card which is specified by the card shoe 44, to the tournament server 10.

In regard to a game of baccarat in the present embodiment, the progress and result of the game are uniquely determined based on cards serially taken out by the main dealer. The main control unit 11 is therefore able to determine a result of a game of baccarat based on the details of cards specified by the card shoe 44.

One capture camera 46*a* of two capture cameras 46 captures the entire main table 40 including the motion of the main dealer. The other capture camera 46*b* of the two capture cameras 46 captures the card arrangement area 45 so as to capture images of cards placed by the main dealer.

The main-dealer control unit 50 is connected to the tournament server 10 in a communicable manner, notifies the tournament server 10 of the start and end of betting, and sends a result of a game of baccarat to the management server 10.

As shown in FIG. 12, the main-dealer control unit 50 includes an information processing unit 51 configured to control the entire operation of the main table 40 and an internal communication unit 52 configured to perform transmission/reception of information between the main-dealer display 42, the touch panel 43, the card shoe 44, and the capture cameras 46.

Figure 13:
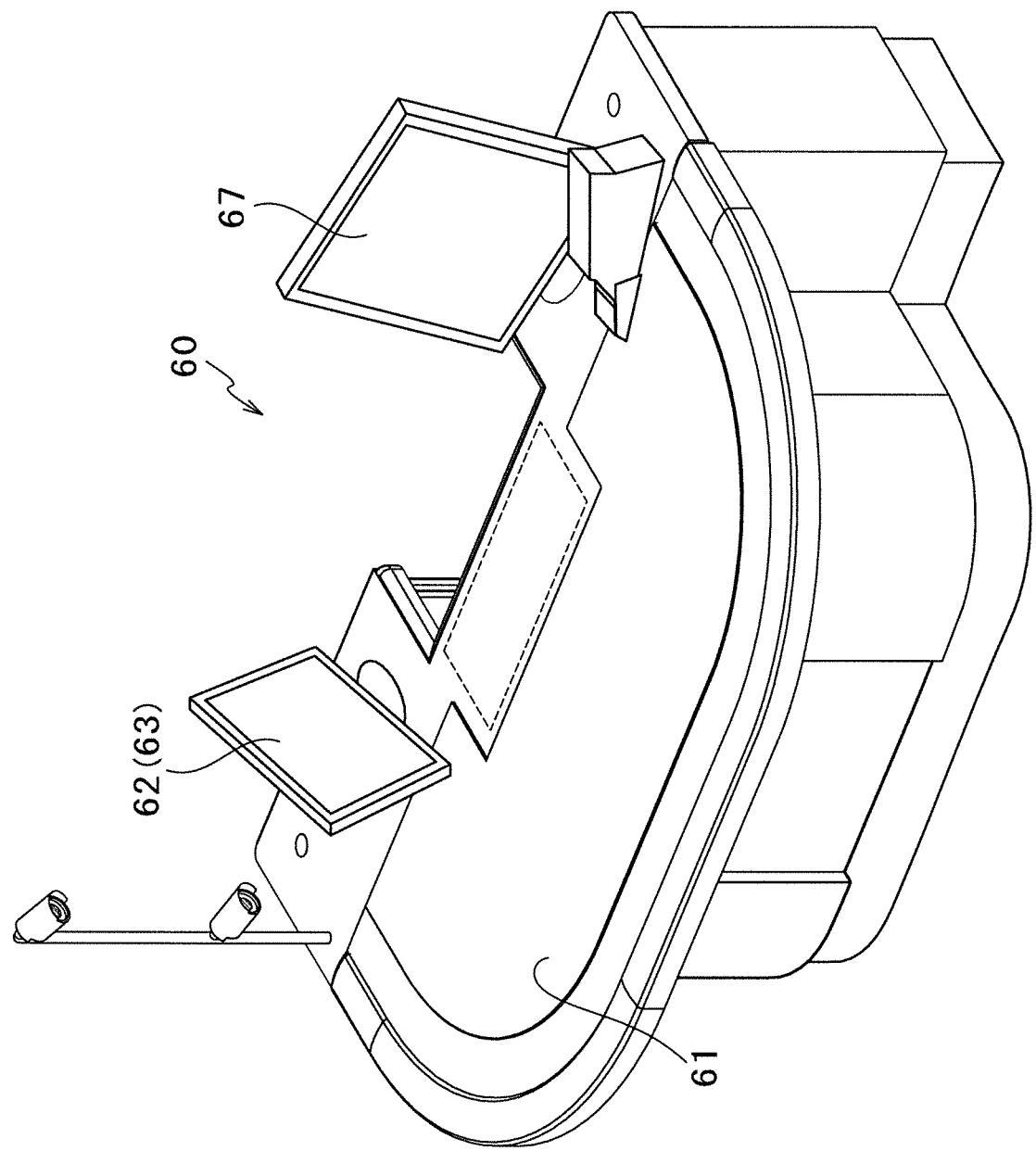
FIG. 13 is a perspective view of a sub table.

At the sub table 60 shown in FIG. 13, six participants sit at the sub table 60, predict a result of a game of baccarat which is executed at the main table 40, and bet chips on the game. At the sub table 60, a sub dealer who supports the progress of the tournament is placed to perform collection and payment of chips in accordance with a game result. At the sub table 60, the participants sit on the substantially-arc side of a top board 61 while the sub dealer is placed on the notch side opposite to the substantially-arc side. The sub table 60 has the same shape and function as the main table 40, but the following description presupposes that the table is used as the sub table 60.

Figure 14:
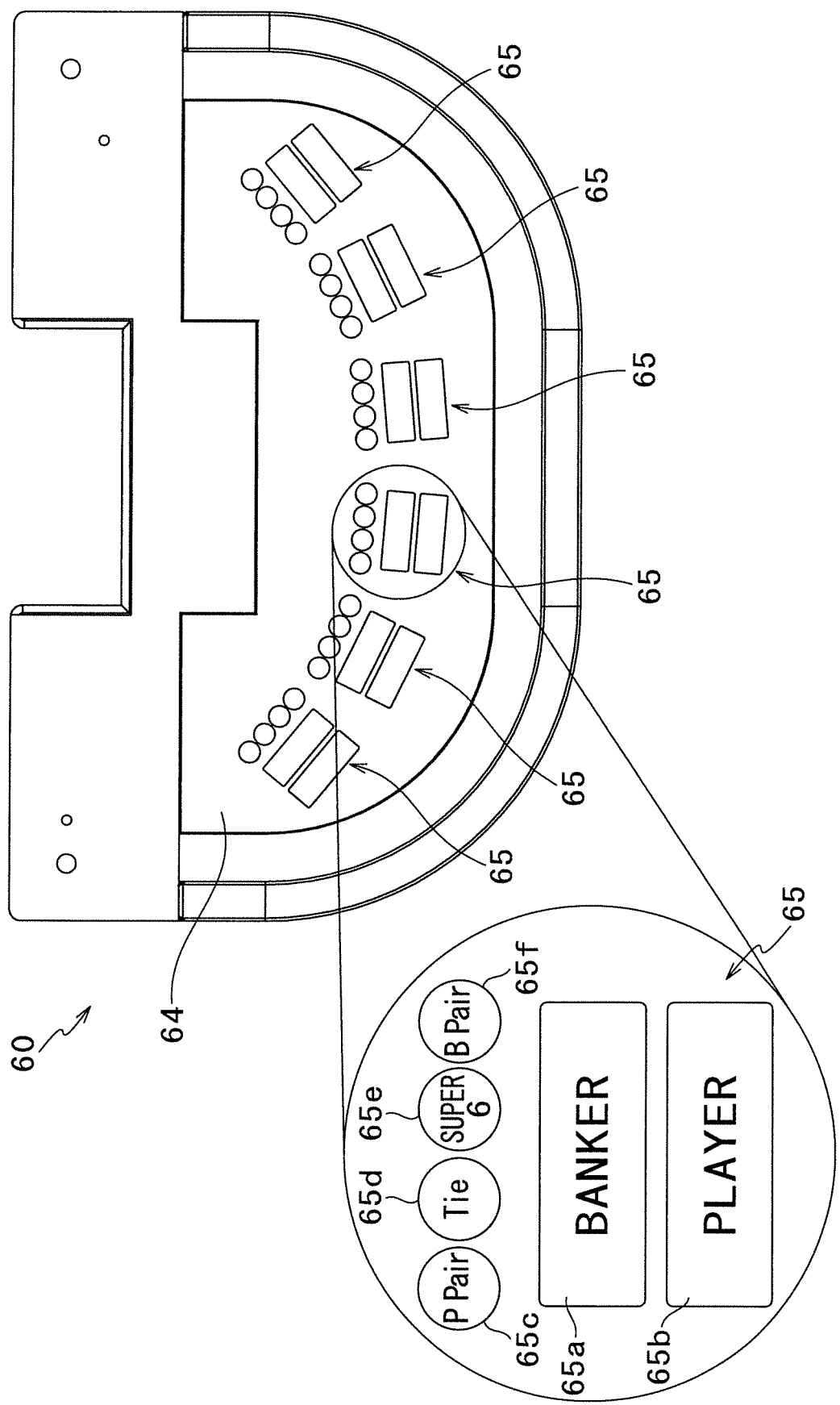
FIG. 14 is a plan view of the sub table.
Figure 15:
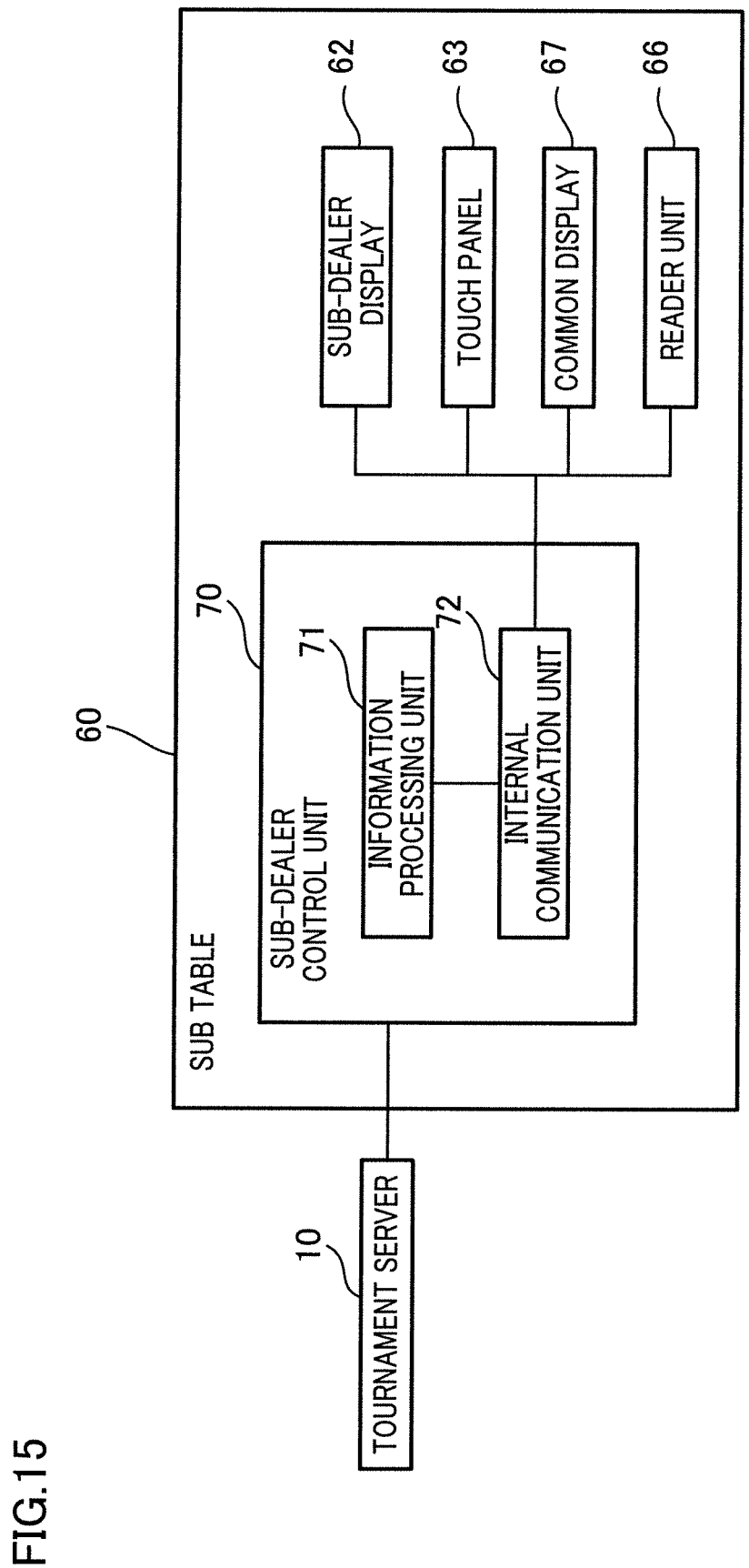
FIG. 15 is a block diagram of the structure of a sub-dealer control unit.

The sub table 60 includes a sub-dealer display 62, a game board 64 (see FIG. 14), a common display 67, and a sub-dealer control unit 70 (see FIG. 15).

The sub-dealer display 62 is provided on the top board 61, and includes a touch panel 63 configured to receive an input from the sub dealer. The game board 64 includes betting areas 65 in which chips are placed by betting and a reader unit 66 provided in each betting area 65 to read chip information. The reader unit 66 is provided on the back side of the betting area 65.

The number of the betting areas 65 is identical with the number of seats allowing the participants to sit at the sub table 60. In other words, each participant uses one betting area 65. While the number of the betting areas 65 is six in the present embodiment, the number of the betting areas 65 may be different.

In each betting area 65, chips are betted by the participant. The game in the present embodiment is baccarat, and each betting area 65 includes a banker area 65*a* and a player area 65*b*. When the participant places a bet on the winning of the banker side, a chip corresponding to a desired bet amount is placed in the banker area 65*a*. When the participant places a bet on the winning of the player side, a chip corresponding to a desired bet amount is placed in the player area 65*b*.

Each betting area 65 further includes a player pair area 65*c*, a tie area 65*d*, a super six area 65*e*, and a banker pair area 65*f* which are used for side betting. When the participant places a bet on a case where the player side wins and the cards form a pair, a chip corresponding to a desired bet amount is placed in the player pair area 65*c*. When the participant places a bet on a tie, a chip corresponding to a desired bet amount is placed in the tie area 65*d*. When the participant places a bet on a case where the banker side wins and a number in the lowest digit of the total number of numbers on the cards is six, a chip corresponding to a desired bet amount is placed in the super six area 65*e*. When the participant places a bet on a case where the banker side wins and the cards form a pair, a chip corresponding to a desired bet amount is placed in the banker pair area 65*f*.

A chip is formed of resin, etc., and has therein a RFID tag which is an IC chip for RFID. The RFID tag of the chip stores a monetary amount as gaming values.

The sub-dealer control unit 70 shown in FIG. 15 is connected to the tournament server 10 in a communicable manner, and sends sitting conditions (i.e., the progress of entry) of participants who have made registrations and bet conditions of the participants to the tournament server 10.

The sub-dealer control unit 70 includes an information processing unit 71 configured to control the entire operation of the sub table 60 and an internal communication unit 72 configured to perform transmission/reception of information between the sub-dealer display 62, the touch panel 63, the common display 67, and each reader unit 66.

The following describes procedures for making the entry of each participant who has made a registration into the tournament, betting on the game of baccarat, collecting betted chips, and performing payment.

Before the tournament starts, the main dealer is placed at the main table 40 and a sub dealer is placed at each sub table 60. The main dealer enters his/her ID and password on the touch panel 43 of the main-dealer display 42, and logs in the tournament server 10. The main dealer selects a menu option for the main dealer from among a menu provided by the game progress unit 17. Because of this, the main control unit 11 of the tournament server 10 reads application software for the main dealer from the game progress unit 17, and sends the application software to the main-dealer control unit 50 via the interface unit 12.

Each sub dealer also enters his/her ID and password on the touch panel 63 of the sub-dealer display 62, and logs in the tournament server 10. The sub dealer selects a menu option for the sub dealer from among the menu provided by the game progress unit 17. Because of this, the main control unit 11 of the tournament server 10 reads application software for the sub dealer from the game progress unit 17, and sends the application software to the sub-dealer control unit 70 via the interface unit 12.

Figure 16:
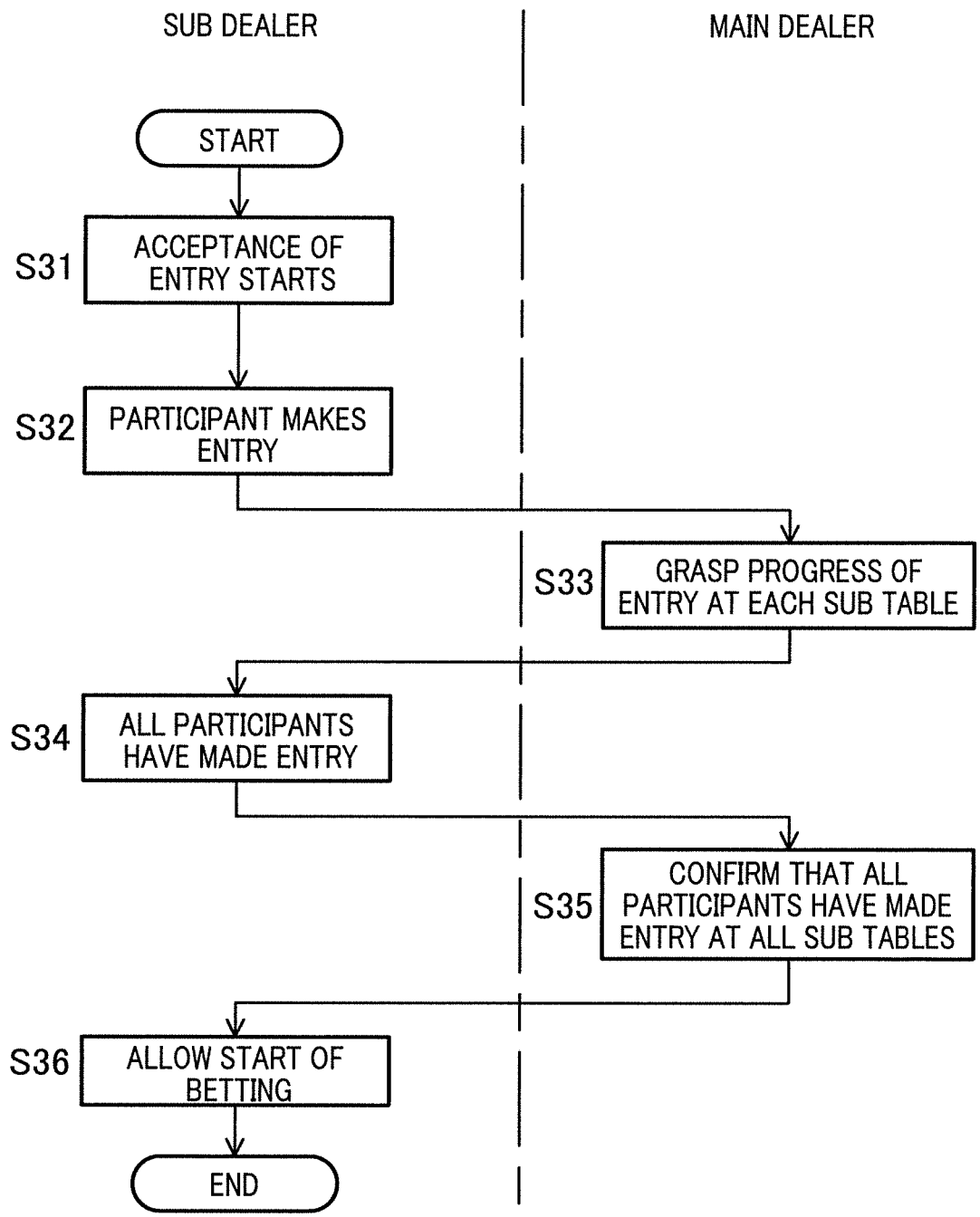
FIG. 16 is a flowchart of accepting the entry of participation applicants.

The main control unit 11 of the tournament server 10 reads member IDs and registration numbers of participants sitting at each sub table 60 from the accepting memory 16, and sends sets of information to the sub-dealer control unit 70. The information processing unit 71 of the sub-dealer control unit 70 causes the sub-dealer display 62 to show the member IDs and the registration numbers (as shown in FIG. 17). Because of this, the sub dealer starts to accept entry as shown in the step S31 of FIG. 16.

Each participant who has made the registration sits at the seat number assigned to the sub table described in the registration certification P4, and makes entry (see step S32). The sub dealer refers to the registration certification P4, checks that the member ID and registration number which are described in the registration certification P4 match with one of member IDs and registration numbers which are displayed on the sub-dealer display 62, and then makes a touch input in the corresponding member ID on the touch panel. This touch input in the member ID causes the sub-dealer control unit 70 to determine that the corresponding participant sits (makes entry). These steps are repeated until all six participants make entry in each sub table 60.

The sub-dealer control unit 70 sends information indicating whether the participants who are to be sit at the corresponding sub table 60 have made entry, to the tournament server 10. The tournament server 10 receives information indicating the progress of entry of participants from each of all eight sub-dealer control units 70, and sends the information to the main-dealer control unit 50 via the interface unit 12. The main-dealer control unit 50 causes the main-dealer display 42 to show (see FIG. 18) whether all participants have made entry in each of all eight sub tables 60. Because of this, the main dealer can grasp the progress of entry in each sub table (see step S33).

In one sub table 60, once all six participants make entry, the sub dealer makes a touch input in the OK button of FIG. 17. Because of this, the sub-dealer control unit 70 determines that all participants have made entry in this sub table 60 (see step S34). This information is sent to the main-dealer control unit 50 from the sub-dealer control unit 70 via the tournament server 10. The main-dealer control unit 50 causes the main-dealer display 42 to show that all participants have made entry in this sub table 60.

When the main dealer confirms that all six participants have made entry in each of all eight sub tables by using the main-dealer display 42 (see step S35), the main dealer makes a touch input in the OK button of FIG. 18. The main control unit 11 of the tournament server 10 to which this information is supplied determines that entry has been completed and betting can be started, and sends bet-start allowance information to each sub-dealer control unit 70. The sub-dealer control unit 70 causes the sub-dealer display 62 to show the bet-start allowance information, and the sub dealer who sees this information allows participants to start betting (see step S36).

Once participants start to place bets in the betting areas 65, the reader units 66 regularly perform the detection of chips placed in the betting areas 65. Therefore, bet information regarding bets which are placed in the betting areas 65 by participants is regularly reflected on the sub-dealer display 62. The sub-dealer display 62 shows a bet screen indicating the bet conditions of participants. As shown in FIG. 19, the bet screen shows objects on which participant bets and gaming values of chips placed by participants. As such, the sub dealer looks at the sub-dealer display 62 to check the bet condition of each participant in the betting area 65, i.e., on which bet object each participant bets and how many bets each participant places.

In this regard, participants can perform secret betting instead of placing bets in the betting areas 65. The secret betting is the way of betting in which a participant writes a bet object and a bet amount in a piece of paper and hands the piece of paper to the sub dealer so that the bet condition of this participant is not known to other participants. The bet condition of this participant is directly input on a screen of the sub-dealer touch panel 63 shown in FIG. 19. The secret betting is allowed once in one round.

In each sub table 60, when all participants have placed bets, the sub dealer makes a touch input in the OK button (see FIG. 19) of the sub-dealer display 62. This information is sent to the main-dealer control unit 50 from the sub-dealer control unit 70 via the tournament server 10. The main-dealer control unit 50 causes the main-dealer display 42 to indicate that all participants have placed bets at each sub table 60 or that betting is being performed (see FIG. 20). In this regard, each bet condition fixed in the sub table 60 is sent to the tournament server 10 from the sub-dealer control unit 70 and stored in the progress support memory 18.

When participants have placed bets in all sub tables 60, the main dealer makes a touch input in the OK button of FIG. 20. This information is sent to each sub-dealer control unit 70 from the main-dealer control unit 50 via the tournament server 10, and the sub-dealer display 62 and the common display 67 show that betting has been completed.

After that, a game of baccarat is started. The main dealer takes out cards from the card shoe 44, and the cards are placed in the card arrangement area 45 by the player and the banker to which the cards are distributed. This state is captured by the capture cameras 46 and displayed on the common display 67 of the sub table 60.

Figure 21:
FIG. 21 is an explanatory diagram of a screen which is displayed on the main-dealer display and which shows a winner.

A result of the game of baccarat is fixed based on the details of the cards placed in the card arrangement area 45. The result of the game of baccarat is determined by the main control unit 11 based on information from the card shoe 44, and displayed on the main-dealer display 42 (see FIG. 21). For example, FIG. 21 indicates that the "player" in which an area inside the solid outer line is painted is a winner. When there is no error in the displayed game result, the main dealer makes a touch input in the OK button of FIG. 21 so as to fix the result of the game of baccarat. The fixed result is sent to the tournament server 10, stored in the progress support memory 18, and displayed on the sub-dealer display 62 and the common display 67 by the main control unit 11.

When the game result is fixed, the sub dealer collects losing chips. Based on the game result, the main control unit 11 specifies an area in which chips to be collected are placed among each group of areas 65a to 65f and displays the specified area on the sub-dealer display 62. While referring to the sub-dealer display 62, the sub dealer collects chips placed in the area where the result was lose.

When the losing chips have been collected, the sub dealer starts payment. Based on the game result, the main control unit 11 specifies an area in which chips for which payment should be performed are placed among each group of areas 65a to 65f and displays the specified area on the sub-dealer display 62. At the same time, the main control unit 11 calculates a payment amount for the area where the result was win and displays the payment amount on the sub-dealer display 62. While referring to the sub-dealer display 62, the sub dealer performs payment for chips placed in the area where the result was win.

While the sub dealer collects chips placed in the area where the result was lose and performs payment for chips placed in the area where the result was win, the main control unit 11 subtracts gaming values of collected chips from gaming values of chips owned by each participant, adds a payment amount to gaming values of chips owned by each participant, and calculates gaming values of chips owned by each participant after the game of baccarat has been executed once. The main control unit 11 then ranks the participants in the descending order of gaming values of chips owned by participants, and stores the ranks in the progress support memory 18. These ranks are sent to the main-dealer display 42, the sub-dealer display 62, and the common display 67 from the interface unit 12 and displayed on these displays.

When the ranks of participants have been determined, the execution of the game of baccarat ends, the next execution of the game of baccarat starts, and participants start to place bets. In the present embodiment, the game of baccarat is repeatedly executed fifteen times in a round. As described above, the game of baccarat is executed for five rounds in the preliminary, two rounds in the quarterfinal, and one round in each of the semifinal and the final. For example, fifteen times of the execution of the game are therefore repeated for five rounds in the preliminary, and among 48 participants, 36 participants who own gaming values (i.e., chips) larger than those of the remaining 12 participants at the end of the preliminary advance to the quarterfinal. The game is executed in the quarterfinal, semifinal, and final in the same manner described above, and the first-place winner, the second-place winner, and the third-place winner are determined.

Aggregated results of a tournament are stored in the tournament server 10 and the marketing server 20 along with the basic information along with the basic information of the tournament and sets of membership information of participants, and are referred in order to, e.g., make promotions of tournaments later.

[Characteristics of Tournament Management Device of Present Embodiment]

The tournament management device 1 of the present embodiment has the following characteristics.

In the tournament management device 1 of the present embodiment, processes from a process of sending promotion information to a process of holding a tournament are executed by the main control unit 11. Therefore, the tournament management device 1 of the present invention can manage tournaments consistently from making promotions to progress of a game and can encourage members to participate in each suitable tournament. Especially, because promotion information is created based on tournament basic information created from data including a game content and the number of participants, it is possible to encourage participation of a member who is interested in the content of the tournament. Furthermore, the consistent tournament management makes it easy to plan and hold a large number of tournaments in a parallel way by managing tournaments automatically or semi-automatically.

In a multi-player tournament in which the maximum number of participants in the game is limited, the tournament management device 1 of the present embodiment is configured to execute the registration process with the two steps, i.e., a pre-registration and a registration, to accept pre-registrations while using the maximum number of participants as an upper limit, to accept a pre-registration which is made after the number of participants exceeds the maximum number of participants as a preliminary registration, to specify members who have made only the pre-registrations, members who have made registrations after the pre-registrations, and members whose pre-registrations or registrations are accepted as preliminary registrations, and to store these members in association with sets of contact address information. Therefore, because the participants in the game are efficiently managed in a bundle by using the promotion information of the tournament, the maximum collection of the participants in the tournament is achieved.

In the tournament management device 1 of the present embodiment, the pre-registrations are accepted for the same number as the maximum number of participants equivalent to the capacity of the tournament. After the number of the accepted pre-registrations reaches the maximum number of participants, pre-registrations are accepted as preliminary registrations. Therefore, even if a participation applicant who has made the pre-registration cannot participate in the tournament, the capacity of the tournament may be filled by allowing participation of a member who has made the preliminary registration in the tournament.

In the tournament management device 1 of the present embodiment, because a registration is allowed only in a case where information indicating that the registration is made matches with pre-registration information, the register process with two steps, i.e., the pre-registration and the registration is reliably executed.

In the tournament management device 1 of the present embodiment, because the main table 40 and each sub table 60 are in synchronization with each other when the tournament game is advanced, the tournament is integrally managed.

In the tournament management device 1 of the present embodiment, the tournament can be efficiently advanced by distinguishing the role of the main table 40 from the role of the sub table 60.

In the tournament management device 1 of the present embodiment, each time the execution of the table game has ended, the tournament server 10 ranks the participants in the descending order of gaming values of chips owned by each participant. Because of this, the ranks of participants are reliably determined even in the tournament in which the table game is executed plural times.

Thus, the embodiment of the present invention is described hereinabove. However, the specific structure of the present invention shall not be interpreted as to be limited to the above described embodiment. The scope of the present invention is defined not only by the above embodiment but also by claims set forth below, and shall encompass the equivalents in the meaning of the claims and every modification within the scope of the claims.

While in the embodiment above the register process with two steps, i.e., the pre-registration and the registration, is executed, the disclosure is not limited to this. For example, execution of a register process with one step also achieves effects similar to the above.

While in the embodiment above chips are betted at all fifteen executions of the game in one round, chips may not be betted at the first three executions of the game in each round and a game of baccarat may be just played by the player and the banker at the main table. This makes it possible to grasp a flow of the tournament.

In the embodiment above, 36 participants out of 48 participants in the preliminary advance to the quarterfinal in descending order of gaming values of chips owned at the time of the end of the preliminary regardless of sub tables at which participants sit. However, the disclosure is not limited to this. Two participants having the largest numbers of gaming values of chips at each sub table may advance to the quarterfinal. Alternatively, a consolation match in which participants who are randomly selected out of participants lost in the preliminary can advance to the quarterfinal may be adopted.

REFERENCE SIGNS LIST

1 tournament management device
11 main control unit (control unit)
12 interface unit (transmission/reception communication port)
24 PC (outside)
30 ticket machine (outside)
40 main table
60 sub table

The invention claimed is:

1. A tournament management device which comprises a transmission/reception communication port for communications with the outside and which is connected to gaming tables in a communicable manner, the tournament management device further comprising a control unit programmed to execute:
   a) a process of creating tournament basic information from data including an input game content and the number of participants, and storing the tournament basic information;
   b) a process of creating, based on the tournament basic information, promotion information which asks for participation in a tournament, sampling sets of contact address information associated with the particular number of members from among sets of membership information stored in a membership database in advance, and sending the promotion information by using the sets of the contact address information;
   c) a process of sending a register screen for participating in the tournament to the outside upon receiving membership identification information associated with membership information regarding one of the members who are asked for the participation;
   d) a register process of receiving a register input to the register screen and storing one of the participants of the tournament in association with the membership identification information on condition that predetermined register information is supplied; and
   e) a process of holding the tournament with registered participants based on the tournament basic information,
   wherein, registers made in the processes c) and d) are pre-registrations, and the control unit is programmed to further execute:
   a process of executing the processes c) and d), accepting the same number of pre-registrations as the maximum number of the participants stored in advance, accepting a pre-registration as a preliminary registration in a case where the number of the participants exceeds the maximum number of the participants, notifying an acceptance target that the preliminary registration is made, and storing membership identification information of that preliminary registration and the rank of the participant who made that preliminary registration among the participants having made preliminary registrations;
   based on a time limit to participate in the tournament, a process of accepting registrations of members who are going to participate at that time and authenticating information indicating that the registrations are made;
   a process of specifying membership information for which the pre-registration is made and for which the registration is not made even after the preset time limit and sending cancellation information of canceling the pre-registration based on contact address information of the membership information;
   a process of notifying contact address information of one of the sets of the membership information of information indicating that the participation is available, a place to participate in the tournament, and the time limit, based on a waiting order of sets of membership information for which the preliminary registrations are made, and waiting for a predetermined time in accordance with the time limit in order to receive participation request information; and
   a process which is executed in a case where the registration of the participation is not made after elapse of the predetermined time and which repeats a process of making notification about the information indicating that the participation is available, the place to participate in the tournament, and the time limit again based on the sets of the stored membership information for which the preliminary registration is made and a process of waiting for the predetermined time in accordance with the time limit in order to receive the participation request information.

2. The tournament management device according to claim 1, wherein, the maximum number of the participants is equal to capacity of the tournament.

3. The tournament management device according to claim 1, wherein, the process of performing the authentication of the information indicating that the registration is made is achieved by determining whether the information indicating that the registration is made matches with pre-registration information.

4. The tournament management device according to claim 1, wherein, the gaming tables include:
   a main table at which a main dealer who advances the tournament is placed; and
   a sub table at which a sub dealer who supports progress of the tournament is placed, and
   the main table and the sub table are in synchronization with each other when the tournament game is advanced.

5. The tournament management device according to claim 4, wherein, a table game is executed at the main table, and
   a result of the table game is predicted and gaming media are betted at the sub table.

6. The tournament management device according to claim 5, wherein, the sub table reads gaming values of the betted gaming media and sends the gaming values to a tournament server, and
the tournament server calculates gaming values of gaming media owned by game participants based on a result of the table game after the table game has ended, and ranks the game participants in descending order of gaming values of gaming media owned by each game participant.

7. The tournament management device according to claim 1, further comprising a ticket machine comprising:
   a display configured to display a screen for the pre-registrations and a screen for the registrations;
   an issuance unit configured to issue a pre-registration certification on which pre-registration information is printed and a registration certification on which registration information is printed; and
   a ticket-machine control unit configured to control an operation of the display and the issuance unit.

* * * * *